(12) United States Patent
White et al.

(10) Patent No.: US 10,965,459 B2
(45) Date of Patent: Mar. 30, 2021

(54) SERVER-CLIENT KEY ESCROW FOR APPLIED KEY MANAGEMENT SYSTEM AND PROCESS

(71) Applicant: Fornetix LLC, Leesburg, VA (US)

(72) Inventors: Charles White, Charles Town, WV (US); Joseph Brand, Charles Town, WV (US)

(73) Assignee: Fornetix LLC, Frederick, MD (US)

( * ) Notice: Subject to any disclaimer, the term of this patent is extended or adjusted under 35 U.S.C. 154(b) by 0 days.

(21) Appl. No.: 15/067,084

(22) Filed: Mar. 10, 2016

(65) Prior Publication Data

US 2016/0269179 A1    Sep. 15, 2016

Related U.S. Application Data

(60) Provisional application No. 62/300,699, filed on Feb. 26, 2016, provisional application No. 62/300,687, filed on Feb. 26, 2016, provisional application No. 62/300,717, filed on Feb. 26, 2016, provisional application No. 62/300,352, filed on Feb. 26, 2016, provisional application No. 62/300,521, filed on Feb. 26, 2016, provisional application No. 62/300,670, filed on Feb. 26, 2016, provisional application No. 62/133,172, filed on Mar. 13, 2015.

(51) Int. Cl.
*H04L 9/08* (2006.01)

(52) U.S. Cl.
CPC .................. *H04L 9/0897* (2013.01)

(58) Field of Classification Search
CPC ..................................... H04L 9/0897

USPC .......................................................... 380/286
See application file for complete search history.

(56) References Cited

U.S. PATENT DOCUMENTS

| 4,316,055 A | 2/1982 | Feistel |
| 5,744,572 A | 4/1998 | Schumann et al. |
| 5,889,953 A | 3/1999 | Thebaut et al. |
| 6,330,562 B1 | 12/2001 | Boden et al. |
| 6,539,495 B1 | 3/2003 | Elko et al. |
| 6,721,888 B1 | 4/2004 | Liu et al. |
| 7,065,643 B1 | 6/2006 | Cornils et al. |
| 7,333,616 B1 | 2/2008 | Brettle et al. |

(Continued)

FOREIGN PATENT DOCUMENTS

| EP | 1 396 979 A2 | 3/2004 |
| EP | 2 055 064 B1 | 2/2013 |

(Continued)

OTHER PUBLICATIONS

Chae Hoon Lira; Key Recovery Attack on Discrete Log-based Schemes Using a Prime Order Subgroup; ICRC 2010; p. 249-262.*

(Continued)

*Primary Examiner* — Monjur Rahim
(74) *Attorney, Agent, or Firm* — Foley & Lardner LLP

(57) ABSTRACT

Embodiments described herein relate to apparatuses and methods for registering and storing a local key associated with a local application of a communication device, including, but not limited to, receiving a request from the communication device to register and store the local key, evaluating the request based on at least one first policy, and sending the request to register and store the local key to a secure key storage.

25 Claims, 15 Drawing Sheets

(56) References Cited

U.S. PATENT DOCUMENTS

| | | |
|---|---|---|
| 7,412,059 B1 | 8/2008 | Pauker et al. |
| 7,512,240 B2 | 3/2009 | Lain et al. |
| 7,607,164 B2 * | 10/2009 | Vasishth ............... G06F 21/577 |
| | | 726/1 |
| 7,610,484 B2 | 10/2009 | Kapoor |
| 7,912,856 B2 | 3/2011 | Hannel et al. |
| 8,099,598 B1 | 1/2012 | Liu |
| 8,116,455 B1 | 2/2012 | Sussland et al. |
| 8,116,456 B2 * | 2/2012 | Thomas ................ H04L 9/0894 |
| | | 380/277 |
| 8,213,620 B1 | 7/2012 | Sussland et al. |
| 8,214,636 B2 * | 7/2012 | Kapoor .................. H04L 9/006 |
| | | 380/279 |
| 8,429,400 B2 | 4/2013 | Khalid et al. |
| 8,538,028 B2 * | 9/2013 | Yeap ....................... H04L 51/28 |
| | | 380/278 |
| 8,559,631 B1 | 10/2013 | Waters |
| 8,726,343 B1 | 5/2014 | Borzycki et al. |
| 8,793,508 B2 | 7/2014 | Von Behren et al. |
| 8,831,992 B2 | 9/2014 | Price et al. |
| 8,943,316 B2 | 1/2015 | Vainstein |
| 8,964,982 B2 | 2/2015 | Takeuchi et al. |
| 8,995,660 B2 | 3/2015 | Kobayashi et al. |
| 9,294,270 B2 | 3/2016 | Wainner et al. |
| 9,369,490 B2 | 6/2016 | Fouladgar et al. |
| 9,565,227 B1 | 2/2017 | Helter et al. |
| 9,639,589 B1 | 5/2017 | Theimer et al. |
| 9,716,728 B1 | 7/2017 | Tumulak |
| 9,729,577 B2 | 8/2017 | White et al. |
| 9,774,448 B2 | 9/2017 | Oberheide et al. |
| 9,853,979 B1 | 12/2017 | Roth et al. |
| 9,858,433 B2 | 1/2018 | Hammoutene et al. |
| 9,977,921 B2 | 5/2018 | Sprague et al. |
| 10,044,503 B1 | 8/2018 | Roth et al. |
| 10,169,600 B2 | 1/2019 | Feng et al. |
| 10,339,106 B2 | 7/2019 | Vijayan et al. |
| 10,523,645 B2 | 12/2019 | Zhu et al. |
| 10,547,598 B2 | 1/2020 | Cates et al. |
| 10,567,511 B2 | 2/2020 | Schmidt et al. |
| 2002/0124086 A1 | 9/2002 | Mar |
| 2002/0178271 A1 | 11/2002 | Graham et al. |
| 2003/0018786 A1 | 1/2003 | Lortz |
| 2003/0035548 A1 * | 2/2003 | Kwan .................... H04L 63/04 |
| | | 380/286 |
| 2003/0060913 A1 | 3/2003 | Turner et al. |
| 2003/0079085 A1 | 4/2003 | Ang |
| 2003/0110397 A1 | 6/2003 | Supramaniam et al. |
| 2003/0115456 A1 | 6/2003 | Kapoor |
| 2003/0115484 A1 | 6/2003 | Moriconi et al. |
| 2003/0126464 A1 | 7/2003 | McDaniel et al. |
| 2003/0149769 A1 | 8/2003 | Axberg et al. |
| 2003/0154404 A1 | 8/2003 | Beadles et al. |
| 2003/0176931 A1 | 9/2003 | Pednault et al. |
| 2004/0030888 A1 | 2/2004 | Roh et al. |
| 2004/0039594 A1 | 2/2004 | Narasimhan et al. |
| 2004/0044891 A1 | 3/2004 | Hanzlik et al. |
| 2004/0073928 A1 | 4/2004 | Alakoski et al. |
| 2004/0086125 A1 | 5/2004 | Lain et al. |
| 2004/0141509 A1 | 7/2004 | Sahni et al. |
| 2004/0151308 A1 | 8/2004 | Kacker et al. |
| 2004/0247131 A1 | 12/2004 | Buer |
| 2005/0005121 A1 | 1/2005 | Chen et al. |
| 2005/0008163 A1 | 1/2005 | Leser et al. |
| 2005/0039031 A1 | 2/2005 | Mont et al. |
| 2005/0044197 A1 | 2/2005 | Lai et al. |
| 2005/0053232 A1 | 3/2005 | Bace |
| 2005/0071439 A1 * | 3/2005 | Bookman ............... H04W 12/06 |
| | | 709/217 |
| 2005/0086477 A1 | 4/2005 | Lin et al. |
| 2005/0195660 A1 | 9/2005 | Kavuri et al. |
| 2005/0198326 A1 | 9/2005 | Schlimmer et al. |
| 2005/0254502 A1 | 11/2005 | Choi |
| 2005/0257045 A1 | 11/2005 | Bushman et al. |
| 2005/0289264 A1 | 12/2005 | Illowsky et al. |
| 2006/0031407 A1 | 2/2006 | Dispensa et al. |
| 2006/0041725 A1 | 2/2006 | Lakshmanamurthy et al. |
| 2006/0106683 A1 | 5/2006 | Fisher et al. |
| 2006/0147043 A1 | 7/2006 | Mann et al. |
| 2006/0161774 A1 * | 7/2006 | Huh ...................... G06F 21/445 |
| | | 713/168 |
| 2006/0190722 A1 * | 8/2006 | Sharma ............. G06Q 20/3829 |
| | | 713/165 |
| 2006/0206440 A1 | 9/2006 | Anderson et al. |
| 2006/0233363 A1 | 10/2006 | Graunke |
| 2006/0236363 A1 | 10/2006 | Heard et al. |
| 2006/0242685 A1 | 10/2006 | Heard et al. |
| 2007/0011736 A1 | 1/2007 | Kalibjian et al. |
| 2007/0071243 A1 * | 3/2007 | Nanda .................... H04L 9/3218 |
| | | 380/277 |
| 2007/0116266 A1 | 5/2007 | Greco et al. |
| 2007/0143407 A1 | 6/2007 | Avritch et al. |
| 2007/0174362 A1 | 7/2007 | Pham et al. |
| 2007/0280483 A1 * | 12/2007 | Fu ......................... H04L 9/0822 |
| | | 380/286 |
| 2008/0014102 A1 | 1/2008 | Lee et al. |
| 2008/0016001 A1 * | 1/2008 | Nakano ............. G11B 20/00086 |
| | | 705/58 |
| 2008/0016335 A1 | 1/2008 | Takahashi et al. |
| 2008/0016550 A1 | 1/2008 | McAlister |
| 2008/0022373 A1 | 1/2008 | Takahashi |
| 2008/0052756 A1 | 2/2008 | Morishige et al. |
| 2008/0059474 A1 | 3/2008 | Lim |
| 2008/0077794 A1 | 3/2008 | Arnold et al. |
| 2008/0118070 A1 | 5/2008 | Yeap et al. |
| 2008/0141023 A1 | 6/2008 | Qi |
| 2008/0209221 A1 * | 8/2008 | Vennelakanti ........ H04W 12/04 |
| | | 713/183 |
| 2008/0216153 A1 * | 9/2008 | Aaltonen ............... H04L 63/083 |
| | | 726/3 |
| 2008/0271022 A1 | 10/2008 | Strassner et al. |
| 2008/0282314 A1 | 11/2008 | Abzarian et al. |
| 2008/0301438 A1 * | 12/2008 | Parkinson ............ H04L 9/3263 |
| | | 713/156 |
| 2009/0044259 A1 * | 2/2009 | Bookman ................ H04L 67/02 |
| | | 726/5 |
| 2009/0077376 A1 | 3/2009 | Montagut et al. |
| 2009/0080658 A1 | 3/2009 | Waters et al. |
| 2009/0083209 A1 | 3/2009 | Corl et al. |
| 2009/0089579 A1 | 4/2009 | Murase et al. |
| 2009/0092252 A1 | 4/2009 | Noll et al. |
| 2009/0100268 A1 | 4/2009 | Garcia et al. |
| 2009/0110189 A1 | 4/2009 | Mayer et al. |
| 2009/0144380 A1 | 6/2009 | Kallman et al. |
| 2009/0154705 A1 | 6/2009 | Price et al. |
| 2009/0178106 A1 | 7/2009 | Feng et al. |
| 2009/0198997 A1 * | 8/2009 | Yeap ....................... H04L 51/28 |
| | | 713/155 |
| 2009/0240725 A1 | 9/2009 | Curtis et al. |
| 2009/0271627 A1 | 10/2009 | Cohen et al. |
| 2009/0327714 A1 | 12/2009 | Yaghmour |
| 2010/0011412 A1 | 1/2010 | Maximilien et al. |
| 2010/0031021 A1 | 2/2010 | Arnold et al. |
| 2010/0064341 A1 | 3/2010 | Aldera |
| 2010/0077214 A1 | 3/2010 | Jogand-Coulomb et al. |
| 2010/0082991 A1 | 4/2010 | Baldwin et al. |
| 2010/0125736 A1 * | 5/2010 | Jang ....................... H04L 9/0822 |
| | | 713/171 |
| 2010/0146582 A1 | 6/2010 | Jaber et al. |
| 2010/0146640 A1 † | 6/2010 | Wang et al. |
| 2010/0180130 A1 | 7/2010 | Stahl et al. |
| 2010/0189262 A1 | 7/2010 | Ducharme et al. |
| 2010/0208898 A1 | 8/2010 | Acar et al. |
| 2010/0218235 A1 | 8/2010 | Ganot |
| 2010/0246827 A1 * | 9/2010 | Lauter .................. G06F 21/6209 |
| | | 380/278 |
| 2010/0246828 A1 | 9/2010 | Johnston |
| 2010/0266132 A1 * | 10/2010 | Bablani ............... H04W 12/1208 |
| | | 380/286 |
| 2010/0299759 A1 * | 11/2010 | Kim .......................... G06F 21/52 |
| | | 726/28 |
| 2010/0332820 A1 * | 12/2010 | Matsushima ........... G06F 21/10 |
| | | 713/150 |

(56) References Cited

U.S. PATENT DOCUMENTS

| | | |
|---|---|---|
| 2011/0038483 A1 | 2/2011 | Goeller et al. |
| 2011/0072135 A1 | 3/2011 | Hannel et al. |
| 2011/0072274 A1* | 3/2011 | Leoutsarakos ........ H04L 9/3255 713/182 |
| 2011/0110525 A1 | 5/2011 | Gentry |
| 2011/0113235 A1* | 5/2011 | Erickson ................ G06F 21/34 713/152 |
| 2011/0131185 A1 | 6/2011 | Kirshenbaum |
| 2011/0131275 A1* | 6/2011 | Maida-Smith ...... G06F 21/6209 709/204 |
| 2011/0145593 A1 | 6/2011 | Auradkar et al. |
| 2011/0164747 A1 | 7/2011 | Junod et al. |
| 2011/0164752 A1 | 7/2011 | Wainner et al. |
| 2011/0167470 A1 | 7/2011 | Walker et al. |
| 2011/0173202 A1 | 7/2011 | Paknad et al. |
| 2011/0182180 A1 | 7/2011 | Riddle |
| 2011/0231443 A1 | 9/2011 | Hannel |
| 2011/0296171 A1* | 12/2011 | Fu .......................... H04L 9/0825 713/156 |
| 2011/0296173 A1 | 12/2011 | Agrawal et al. |
| 2011/0320809 A1 | 12/2011 | Amendola et al. |
| 2012/0011560 A1 | 1/2012 | Natarajan et al. |
| 2012/0036370 A1 | 2/2012 | Lim et al. |
| 2012/0099728 A1* | 4/2012 | Rich ........................ H04L 63/06 380/277 |
| 2012/0110328 A1* | 5/2012 | Pate ...................... H04L 63/062 713/165 |
| 2012/0131164 A1 | 5/2012 | Bryan et al. |
| 2012/0143876 A1 | 6/2012 | Srinivasan et al. |
| 2012/0144186 A1 | 6/2012 | Puiggali Allepuz et al. |
| 2012/0159178 A1 | 6/2012 | Lin et al. |
| 2012/0204032 A1 | 8/2012 | Wilkins et al. |
| 2012/0225895 A1 | 9/2012 | Takahashi et al. |
| 2012/0226895 A1 | 9/2012 | Anderson et al. |
| 2012/0297200 A1 | 11/2012 | Thom et al. |
| 2012/0324482 A1 | 12/2012 | Park |
| 2013/0019090 A1 | 1/2013 | Wicker |
| 2013/0044878 A1 | 2/2013 | Rich et al. |
| 2013/0044882 A1 | 2/2013 | Rich et al. |
| 2013/0061054 A1 | 3/2013 | Niccolai |
| 2013/0097123 A1 | 4/2013 | McColgan et al. |
| 2013/0148810 A1* | 6/2013 | Goel .................... G06F 21/6209 380/278 |
| 2013/0232336 A1* | 9/2013 | Cheung ................ H04L 9/3226 713/156 |
| 2013/0246377 A1 | 9/2013 | Gaitonde |
| 2013/0247142 A1 | 9/2013 | Nishizawa et al. |
| 2013/0262612 A1* | 10/2013 | Langas ................ G06F 3/0679 709/211 |
| 2013/0262866 A1* | 10/2013 | Gu ...................... H04L 63/0428 713/167 |
| 2013/0268753 A1 | 10/2013 | Vanderpol et al. |
| 2013/0318343 A1* | 11/2013 | Bjarnason ............ H04L 63/08 713/157 |
| 2014/0006685 A1 | 1/2014 | Peterson et al. |
| 2014/0013110 A1* | 1/2014 | Thoniel ................... H04L 9/321 713/156 |
| 2014/0019753 A1 | 1/2014 | Lovvry et al. |
| 2014/0068273 A1 | 3/2014 | Sobel |
| 2014/0095450 A1 | 4/2014 | Marwah et al. |
| 2014/0095890 A1 | 4/2014 | Mangalore et al. |
| 2014/0108814 A1 | 4/2014 | Bharadwaj et al. |
| 2014/0122895 A1 | 5/2014 | Khosravi et al. |
| 2014/0130119 A1 | 5/2014 | Goldschlag et al. |
| 2014/0143826 A1 | 5/2014 | Sharp et al. |
| 2014/0177830 A1 | 6/2014 | Gajek |
| 2014/0189783 A1 | 7/2014 | Kapoor et al. |
| 2014/0195564 A1 | 7/2014 | Talagala et al. |
| 2014/0229736 A1 | 8/2014 | Asim et al. |
| 2014/0229739 A1 | 8/2014 | Roth et al. |
| 2014/0281490 A1 | 9/2014 | Prakash et al. |
| 2014/0282846 A1 | 9/2014 | Deweese et al. |
| 2014/0282854 A1 | 9/2014 | Clark et al. |
| 2014/0344571 A1 | 11/2014 | Adam et al. |
| 2014/0365764 A1 | 12/2014 | Buer |
| 2015/0006882 A1 | 1/2015 | Hernandez et al. |
| 2015/0013018 A1 | 1/2015 | Yan |
| 2015/0082041 A1 | 3/2015 | Gaspar Cuevas |
| 2015/0086020 A1 | 3/2015 | Harjula et al. |
| 2015/0095970 A1 | 4/2015 | Shetty et al. |
| 2015/0098567 A1* | 4/2015 | Park .................. H04W 12/0013 380/44 |
| 2015/0101012 A1* | 4/2015 | White .................. G06F 16/245 726/1 |
| 2015/0106626 A1* | 4/2015 | Kremp ................ G06F 21/6209 713/189 |
| 2015/0149427 A1 | 5/2015 | Kerschbaum et al. |
| 2015/0154418 A1 | 6/2015 | Redberg |
| 2015/0186657 A1 | 7/2015 | Nakhjiri |
| 2015/0222606 A1 | 8/2015 | Yan |
| 2015/0244684 A1 | 8/2015 | Ng et al. |
| 2015/0254150 A1 | 9/2015 | Gordan et al. |
| 2015/0271144 A1 | 9/2015 | Ronca |
| 2015/0271154 A1 | 9/2015 | Ronca |
| 2015/0271157 A1 | 9/2015 | Ronca |
| 2015/0271158 A1 | 9/2015 | Ronca |
| 2015/0278271 A1 | 10/2015 | Chander et al. |
| 2015/0278283 A1 | 10/2015 | O'Krafka et al. |
| 2015/0304309 A1* | 10/2015 | Verma .................. H04L 9/3263 713/156 |
| 2015/0319146 A1 | 11/2015 | Chen et al. |
| 2015/0358153 A1 | 12/2015 | Gentry |
| 2015/0372997 A1 | 12/2015 | Lokamathe et al. |
| 2016/0004481 A1 | 1/2016 | Lakshman |
| 2016/0014095 A1 | 1/2016 | Strayer et al. |
| 2016/0044003 A1 | 2/2016 | Raykova et al. |
| 2016/0048408 A1 | 2/2016 | Madhu et al. |
| 2016/0078239 A1 | 3/2016 | Beiter et al. |
| 2016/0080380 A1 | 3/2016 | Dawoud Shenouda Dawoud et al. |
| 2016/0094555 A1 | 3/2016 | Kiperberg et al. |
| 2016/0103838 A1 | 4/2016 | Sainani et al. |
| 2016/0112376 A1 | 4/2016 | Gomez et al. |
| 2016/0140347 A1 | 5/2016 | Schaad |
| 2016/0182470 A1 | 6/2016 | Rubin et al. |
| 2016/0224799 A1 | 8/2016 | Uzun et al. |
| 2016/0269179 A1 | 9/2016 | White et al. |
| 2016/0269364 A1 | 9/2016 | White et al. |
| 2016/0269373 A1 | 9/2016 | White et al. |
| 2016/0277187 A1 | 9/2016 | Nabeel |
| 2016/0294548 A1 | 10/2016 | Qian et al. |
| 2016/0366141 A1 | 12/2016 | Smith et al. |
| 2016/0373455 A1 | 12/2016 | Shokhrin et al. |
| 2017/0103227 A1 | 4/2017 | Kerschbaum et al. |
| 2017/0104762 A1 | 4/2017 | Feng et al. |
| 2017/0139640 A1 | 5/2017 | Bakre et al. |
| 2017/0147709 A1 | 5/2017 | Ganz |
| 2017/0155676 A1 | 6/2017 | Tamir et al. |
| 2017/0250964 A1 | 8/2017 | Edwards et al. |
| 2017/0251022 A1 | 8/2017 | White et al. |
| 2017/0286454 A1 | 10/2017 | Saeki et al. |
| 2017/0324780 A1 | 11/2017 | White et al. |
| 2018/0109504 A1 | 4/2018 | Poffenbarger |
| 2018/0144148 A1 | 5/2018 | Rattan et al. |
| 2018/0176017 A1 | 6/2018 | Rodriguez et al. |
| 2018/0189137 A1 | 7/2018 | De Keyser et al. |
| 2018/0294975 A1 | 10/2018 | Woods et al. |

FOREIGN PATENT DOCUMENTS

| | | |
|---|---|---|
| EP | 2 995 038 A4 | 11/2016 |
| FR | 2922392 B1 | 4/2009 |
| GB | 2 471 282 | 12/2010 |
| GB | 2 472 491 B | 9/2013 |
| WO | WO-03/073762 | 9/2003 |
| WO | WO-2008/061344 A1 | 5/2008 |

(56) References Cited

FOREIGN PATENT DOCUMENTS

| WO | WO-2018/075912 A1 | 4/2018 |
|---|---|---|
| WO | WO-2019/129842 A1 | 7/2019 |

OTHER PUBLICATIONS

PCT International Search Report and Written Opinion dated Jun. 29, 2016, from related application No. PCT/US2016/022357.
PCT International Search Report and Written Opinion dated Jul. 12, 2016, from related application No. PCT/U52016/022360.
International Search Report and Written Opinion dated Jun. 1, 2017, from related application No. PCT/US2017/019202.
International Search Report and Written Opinion dated Jun. 2, 2017, from related application No. PCT/US2017/019162.
International Search Report and Written Opinion dated Jun. 2, 2017, from related application No. PCT/US2017/019205.
International Search Report and Written Opinion dated Jun. 2, 2017, from related application No. PCT/US2017/019209.
International Search Report and Written Opinion dated May 24, 2017, from related application No. PCT/US2017/019204.
International Search Report and Written Opinion dated May 30, 2017, from related application No. PCT/US2017/019207.
International Search Report and Written Opinion dated Aug. 30, 2016, from related application No. PCT/US2016/022363.
International Search Report and Written Opinion dated Aug. 30, 2016, from related application No. PCT/US2016/022366.
Anonymous, "File system permissions", Feb. 27, 2015, XP055487883, retrieved from the Internet: URL: https://en.wikipedia.org/w/index.php?title=File_system_permission&oldid=649024735, [retrieved on Jun. 26, 2018], p. 1-4, 7 pages.
Anonymous, "How ACL inheritance works", Feb. 28, 2014, XP055487629, retrieved from the Internet: URL: https://library.netapp.com.ecmdocs/ECMP1401220/html/GUID-9320A39F-F278-4368-B8AB-561856881E5F.html, [retrieved on Jun. 25, 2018], 2 pages.
Extended European Search Report dated Jul. 10, 2018, from application No. 16762710.8.
Extended European Search Report dated Jul. 24, 2018, from application No. 16762706.6.
Extended European Search Report dated Jul. 3, 2018, from application No. 16762708.2.
Final Office Action dated Jul. 10, 2018, from U.S. Appl. No. 15/067,074.
Final Office Action dated Sep. 14, 2018, from U.S. Appl. No. 15/067,035.
International Preliminary Report on Patentability dated Sep. 7, 2018, from application No. PCT/US2017/019162.
International Preliminary Report on Patentability dated Sep. 7, 2018, from application No. PCT/US2017/019204.
International Preliminary Report on Patentability dated Sep. 7, 2018, from application No. PCT/US2017/019205.
Non-Final Office Action dated Sep. 7, 2018, from U.S. Appl. No. 15/439,839.
International Preliminary Report on Patentability dated Sep. 21, 2017, from application No. PCT/US2016/022357.
International Preliminary Report on Patentability dated Sep. 21, 2017, from application No. PCT/US2016/022360.
International Preliminary Report on Patentability dated Sep. 21, 2017, from application No. PCT/US2016/022363.
International Preliminary Report on Patentability dated Sep. 28, 2017, from application No. PCT/US2016/022366.
U.S. Notice of Allowance dated Mar. 26, 2018, from U.S. Appl. No. 15/067,814.
U.S. Office Action dated Nov. 16, 2017, from U.S. Appl. No. 15/067,814.
U.S. Office Action dated Dec. 26, 2017, from U.S. Appl. No. 15/067,074.
U.S. Office Action dated Jun. 6, 2018, from U.S. Appl. No. 15/067,035.
Non-Final Office Action dated Mar. 5, 2019, from U.S. Appl. No. 15/067,035.
Notice of Allowance dated Feb. 28, 2019, from U.S. Appl. No. 15/439,839.
Final Office Action dated Apr. 16, 2019, from U.S. Appl. No. 15/439,873.
Final Office Action dated Apr. 22, 2019, from U.S. Appl. No. 15/439,077.
Final Office Action dated Mar. 29, 2019, from U.S. Appl. No. 15/439,861.
Non-Final Office Action dated Apr. 18, 2019, from U.S. Appl. No. 15/439,455.
Non-Final Office Action dated Apr. 2, 2019, from U.S. Appl. No. 15/439,781.
Non-Final Office Action dated Dec. 31, 2018, from U.S. Appl. No. 15/954,280.
Non-Final Office Action dated Nov. 2, 2018, from U.S. Appl. No. 15/439,455.
Non-Final Office Action dated Oct. 12, 2018, from U.S. Appl. No. 15/439,861.
Non-Final Office Action dated Oct. 29, 2018, from U.S. Appl. No. 15/439,077.
Non-Final Office Action dated Oct. 4, 2018, from U.S. Appl. No. 15/439,873.
Final Office Action dated Jun. 6, 2019, from U.S. Appl. No. 15/954,280.
Notice of Allowance dated Jun. 3, 2019, from U.S. Appl. No. 15/067,074.
Anonymous, "apache 2.2—What are the symlinks for in /etc/ssl/private ?(Ubuntu server)—Server Fault", Jul. 11, 2010, Retrieved from the Internet: URL:https//serverfault.com/questions/159368/what-are-the-symlinks-for-in-etc-ssl-private-ubuntu-server.
Anonymous, "Symbolic link—Wikipedia", Mar. 5, 2015, Retrieved from the Internet: URL:https://en.wikipedia.org/w/index.php?title=Symbolic_ink&oldid=650003488.
Australian Examination Report dated May 18, 2020, from application No. 2016228531.
European Office Action dated Apr. 28, 2020, from application No. 16762708.2.
European Office Action dated Apr. 30, 2020, from application No. 16762710.8.
European Office Action dated May 4, 2020, from application No. 16762706.6.
Grolimund, et al., "Cryptree: A Folder Tree Structure for Cryptographic File Systems", Reliable Distributed Systems, 2006, SRDS '06. 25th IEEE Symposium on, IEEE, PI, Oct. 1, 2006, pp. 189-198.
Israeli Office Action dated May 11, 2020, from application No. 254382.
Final Office Action dated Jun. 15, 2020, from U.S. Appl. No. 15/439,781.
Goi et al., Incremental Hash Function Based on Pair Chaining & Modular Arithmetic Combining, Springer (Year: 2001).
Goodman et al., Hashing Strategies for the Cray XMT, IEEE (Year: 2010).
Non-Final Office Action dated Apr. 3, 2020, from U.S. Appl. No. 15/439,873.
Non-Final Office Action dated Jun. 5, 2020, from U.S. Appl. No. 15/439,861.
Non-Final Office Action dated Jun. 23, 2020, from U.S. Appl. No. 15/439,077.
Ramakrishna et al., Performance in Practice of String Hash Function, Database system conference, Australia (Year: 1997).
Singh et al., Choosing Best Hashing Strategies and Hash Functions, IEEE (Year: 2009).
Final Office Action dated Aug. 22, 2019, from U.S. Appl. No. 15/439,781.
Israeli Office Action dated Aug. 5, 2019, from application No. 254382.
Non-Final Office Action dated Aug. 8, 2019, from U.S. Appl. No. 15/439,873.
Non-Final Office Action dated Sep. 10, 2019, from U.S. Appl. No. 15/439,861.

(56) References Cited

OTHER PUBLICATIONS

Wang et al., An Efficient File Hierarchy Attribute-Based Encryption Scheme in Cloud Computing, IEEE (Year: 2016).
Final Office Action dated Jul. 17, 2019, from U.S. Appl. No. 15/067,035.
Israeli Office Action dated Jun. 23, 2019, from application No. 254561.
Israeli Office Action dated Jun. 25, 2019, from application No. 254381.
Extended European Search Report dated Jan. 13, 2020, from application No. 17757225.2.
Final Office Action dated Feb. 10, 2020, from U.S. Appl. No. 15/439,077.
Final Office Action dated Feb. 10, 2020, from U.S. Appl. No. 15/439,861.
Final Office Action dated Feb. 7, 2020, from U.S. Appl. No. 15/439,873.
Huang et al., "ASPE: attribute-based secure policy enforcement in vehicular ad hoc networks" Ad Hoc Networks, 2009, 7, pp. 1526-1535.
Non-Final Office Action dated Feb. 14, 2020, from U.S. Appl. No. 15/439,455.
Scalavino, et al., "PAES: Policy-Based Authority Evaluation Scheme", IFIP International Federation for Information Processing 2009, LNCS 5645, pp. 268-282.
Wang et al., Performance Evaluation of Attribute-Based Encryption: Toward Data Privacy in the IoT, IEEE ICC 2014—Communication and Information Systems Security Symposium, 2014, pp. 725-730.
Australian Examiner's Report dated Oct. 11, 2019, from application No. 2016228528.
Non-Final Office Action dated Dec. 31, 2019, from U.S. Appl. No. 15/439,781.
Notice of Allowance dated Dec. 18, 2019, from U.S. Appl. No. 15/067,074.
Israeli Office Action dated Jul. 3, 2020, from application No. 254561.
Anonymous, "chmod—Wikipedia", Dec. 1, 2015, XP055621754, retrieved from the Internet: URL: https://en.wikipedia.org/w/index.php?title=Chmod&oldid=693340984 [retrieved on Sep. 12, 2019].
Anonymous, "Command-line interface-Wikipedia", Feb. 25, 2016, XP055622916, retrieved from the Internet: URL: https://en.wikipedia.org/w/index.php?title=Command-line_interface&oldid=706826006 [retrieved on Sep. 17, 2019], pp. 6-14.
Australian Examination Report dated Oct. 3, 2019, for application No. 2016228526.
Australian Examination Report dated Sep. 30, 2019, for application No. 2016228531.
Broberg, et al., "The Anatomy and Facets of Dynamic Policies", 2015 IEEE 28th Computer Security Foundations Symposium, IEEE, Jul. 13, 2015, pp. 122-136.
Extended European Search Report dated Oct. 11, 2019, from application No. 17757244.3.
Extended European Search Report dated Oct. 4, 2019, from application No. 17757242.7.
Extended European Search Report dated Sep. 20, 2019, from application No. 17757246.8.
Extended European Search Report dated Sep. 24, 2019, from application No. 17757243.5.
Extended European Search Report dated Sep. 27, 2019, from application No. 17757241.9.
Final Office Action dated Sep. 27, 2019, from U.S. Appl. No. 15/439,455.
Lang, et al., "Extending the Ciphertext-Policy Attribute Based Encryption Scheme for Supporting Flexible Access Control", 2013 International Conference on Security and Cryptography, Jul. 29, 2013 pp. 1-11.
Non-Final Office Action dated Oct. 25, 2019, from U.S. Appl. No. 15/439,077.
Notice of Allowance dated Sep. 23, 2019, from U.S. Appl. No. 15/954,280.
Notice of Allowance dated Sep. 27, 2019, from U.S. Appl. No. 15/067,035.
Partial Supplementary European Search Report dated Oct. 2, 2019, from application No. 17757225.2.
Pirretti, et al., "Secure Attribute-Based Systems", Proceedings of the 13th. ACM Conference on Computer and Communications Security, Oct. 30-Nov. 3, 2006, pp. 99-112.
Final Office Action dated Jul. 7, 2020, from U.S. Appl. No. 15/439,455.
Notice of Allowance dated Aug. 17, 2020, from U.S. Appl. No. 15/439,077.
Notice of Allowance dated Aug. 28, 2020, from U.S. Appl. No. 15/439,781.
Notice of Allowance dated Oct. 21, 2020, from U.S. Appl. No. 15/439,873.
Notice of Allowance dated Sep. 30, 2020, from U.S. Appl. No. 15/439,455.
Anonymous, "Block cipher mode of operation—Wikipedia", Jan. 7, 2017, XP055750229, retrieved from the Internet: URL: https://en.wikipedia.org/w/index.php?title=Block_cipher_mode_of_operation&96did=758793932 [retrieved on Nov. 13, 2020].
European Office Action dated Dec. 1, 2020, from U.S. Appl. No. 17757246.8.
European Office Action dated Nov. 18, 2020, U.S. Appl. No. 17757243.5.

\* cited by examiner
† cited by third party

SERVER-CLIENT KEY ESCROW FOR APPLIED KEY MANAGEMENT SYSTEM AND PROCESS

CROSS-REFERENCE TO RELATED PATENT APPLICATIONS

This application claims priority from U.S. Provisional Application 62/133,172, filed Mar. 13, 2015, which is incorporated herein by reference in its entirety. This application is related to U.S. application Ser. No. 14/506,346, titled System And Method For Encryption Key Management Federation And Distribution, and filed Oct. 3, 2014, which is incorporated herein by reference in its entirety. The present disclosure claims priority to, and the benefit of, U.S. provisional patent application Ser. No. 62/300,352, titled Policy-Enabled Encryption Keys Having Complex Logical Operations, and filed on Feb. 26, 2016, which is incorporated herein by reference in its entirety. The present disclosure claims priority to, and the benefit of, U.S. provisional patent application Ser. No. 62/300,521, titled Policy-Enabled Encryption Keys Having Ephemeral Policies, and filed on Feb. 26, 2016, which is incorporated herein by reference in its entirety. The present disclosure claims priority to, and the benefit of, U.S. provisional patent application Ser. No. 62/300,670, titled Structure Of Policies For Evaluating Key Attributes Of Encryption Keys, and filed on Feb. 26, 2016, which is incorporated herein by reference in its entirety. The present disclosure claims priority to, and the benefit of, U.S. provisional patent application Ser. No. 62/300,687, titled Linking Encryption Key Management With Granular Policy, and filed on Feb. 26, 2016, which is incorporated herein by reference in its entirety. The present disclosure claims priority to, and the benefit of, U.S. provisional patent application Ser. No. 62/300,699 titled System And Method For Associating Encryption Key Management Policy With Device Activity, and filed on Feb. 26, 2016, which is incorporated herein by reference in its entirety. The present disclosure claims priority to, and the benefit of, U.S. provisional patent application Ser. No. 62/300,717, titled System And Method For Hierarchy Manipulation In An Encryption Key Management System, and filed on Feb. 26, 2016, which is incorporated herein by reference in its entirety.

BACKGROUND

1. Field of the Invention

Embodiments of the present invention relate generally to security objects used in communication systems and, more specifically, to generation, management, distribution, federation, and/or applied key management of security objects.

2. Background

In security systems, an encryption key refers to a parameter or data that dictates how plain data may be translated into encrypted data during an encryption process and encrypted data into plain data during a decryption process. Typically, the encryption key is made available both of a source device (e.g., a transmitting device) and a target device (e.g., a receiving device) in a communication transaction. Given that encryption keys are used pervasively, effective management of the encryption keys (as well as other security objects) to defend and respond to threats against the security systems is of paramount importance.

Traditionally, encryption key management is initiated and executed at the device level (e.g., by the source device and/or the target device that are involved in the communication transaction). Communication management, on the other hand, is traditionally centrally managed at a higher level (e.g., by a server for the source device and target device). The end result may be that the encryption management is procedurally unsynchronized with communications management. Thus, loose controls of encryption keys, as demonstrated in current public key infrastructure (PKI) instances, may result. In addition, loose controls of symmetric keys generated and distributed in an enterprise may also occur. Accordingly, an end result may be a breakdown in communication management or communication security. Similar problems confront other types of encryption objects.

Various tools for full disk encryption may require gathering keys in a location for management. Conventionally, no mechanism exists to automate gathering and storing of keys across various local user applications, for example, as a part of recovery operations. Secure Shell (SSH) and other interface/protocol for system access conventionally focus on localized generation of encryption keys for user authentication. Local applications may use local keys to unlock application functionalities as a part of software licensing on a client. Some applications such as, but not limited to, messaging, communication application, and the like may require separate distribution of symmetric and/or asymmetric keys for encrypted communication. Storage or distribution of encrypted information may require separate key management and distribution activities.

SUMMARY OF THE DISCLOSURE

Embodiments described herein relate to providing a client-based service for integrating local applications, servers, and/or infrastructure with applied key management operations (including evaluations based on policies) provided by an applied key management system or server. A client (e.g., a communication device) may have local applications, servers, and/or infrastructure that do not have defined encryption key management capacities or interfaces natively. Thus, the client-based service may serve as an interface between the applied key management system and one or more of the local applications, servers, and/or infrastructure of the client.

In some embodiments, the client-based service may include an applied key management client interface to enable automated collection of key file materials in the client. Uses of the key file materials may include, but are not limited to, local user disk encryption, secure communication, application license keys, and the like. Accordingly, embodiments described herein are concerned with interfacing with the applied key management system to enable centralized escrow of key file material local to the client based on the policies.

In some embodiments, a method for registering and storing a local key associated with a local application of a communication device includes sending a request to an applied key management system to register and store the local key at a secure key storage and receiving a response from the applied key management system. Registering and storing the local key at the secure key storage are authorized by at least one first policy.

In some embodiments, the local key is one or more of a locally-generated encryption key or locally-stored encryption key.

In some embodiments, the local key includes one or more of a key file for secure data storage, key data for SSH, or license key for an application.

In some embodiments, the secure key storage is one or more of a Hardware Security Module (HSM), key management server, or secure data storage.

In some embodiments, the request is sent over a network link. The response is received over the network link.

In some embodiments, the method further includes determining whether the local key needs to be registered and stored.

In some embodiments, determining whether the local key needs to be registered and stored includes determining whether the local key has been previously registered and stored.

In some embodiments, the method further includes sending a recovery request to the applied key management system to recover the local key from the secure key storage and receiving the local key from the applied key management system, wherein recovering the local key from the secure key storage is authorized by at least one second policy.

In some embodiments, a communication device includes a local key store, a memory, and a processor implementing a client interface. The client interface is configured to send a request to an applied key management system to register and store the local key at a secure key storage and receive a response from the applied key management system, wherein registering and storing the local key at the secure key storage are authorized by at least one first policy.

In some embodiments, a non-transitory processor-readable medium having processor-readable instructions, such that, when executed, causes a processor to send a request to an applied key management system to register and store the local key at a secure key storage and receive a response from the applied key management system, wherein registering and storing the local key at the secure key storage are authorized by at least one first policy.

In some embodiments, a method for registering and storing a local key associated with a local application of a communication device, including receiving a request from the communication device to register and store the local key evaluating the request based on at least one first policy, and sending the request to register and store the local key to a secure key storage.

In some embodiments, the request is received from the communication device via a first network link and the request is sent to the secure key storage via a second network link.

In some embodiments, the request is received from the communication device via a first network link. The request is sent to the secure key storage locally.

In some embodiments, the request includes one or more of key attributes of the local key, application identifier identifying the local application, user identifier identifying a user authorized to use the local key, device identifier identifying the communication device, or time at which the local key is collected.

In some embodiments, evaluating the request based on the at least one policy includes evaluating one or more of the key attributes of the local key, application identifier identifying the local application, user identifier identifying a user authorized to use the local key, device identifier identifying the communication device, or time at which the local key may be collected based on the at least one first policy.

In some embodiments, the method further includes receiving a recovery request from the communication device, the recovery request corresponds to recovering the local key from the secure key storage, evaluating the recovery request based on at least one second policy, sending the recovery request to the secure key storage, receiving the local key from the secure key storage, and sending the local key to the communication device.

In some embodiments, the recovery request received from the communication device includes one or more of key attribute of the local key, application identifier identifying the local application associated with the local key, user identifier identifying a user authorized to use the local key, device identifier identifying the communication device, or time at which the local key is collected.

In some embodiments, evaluating the recovery request based on the at least one policy includes evaluating one or more of the key attribute of the local key, application identifier identifying the local application associated with the local key, user identifier identifying a user authorized to use the local key, device identifier identifying the communication device, or time at which the local key is collected based on the at least one second policy.

In some embodiments, an applied key management system, including a memory and a processor, the processor configured to receive a request from a communication device to register and store a local key, evaluate the request based on at least one first policy, and send the request to register and store the local key to a secure key storage.

In some embodiments, a non-transitory processor-readable medium having processor-readable instructions, such that, when executed, causes a processor to receive a request from a communication device to register and store a local key, evaluate the request based on at least one first policy, and send the request to register and store the local key to a secure key storage.

DETAILED DESCRIPTION

Figure 1:
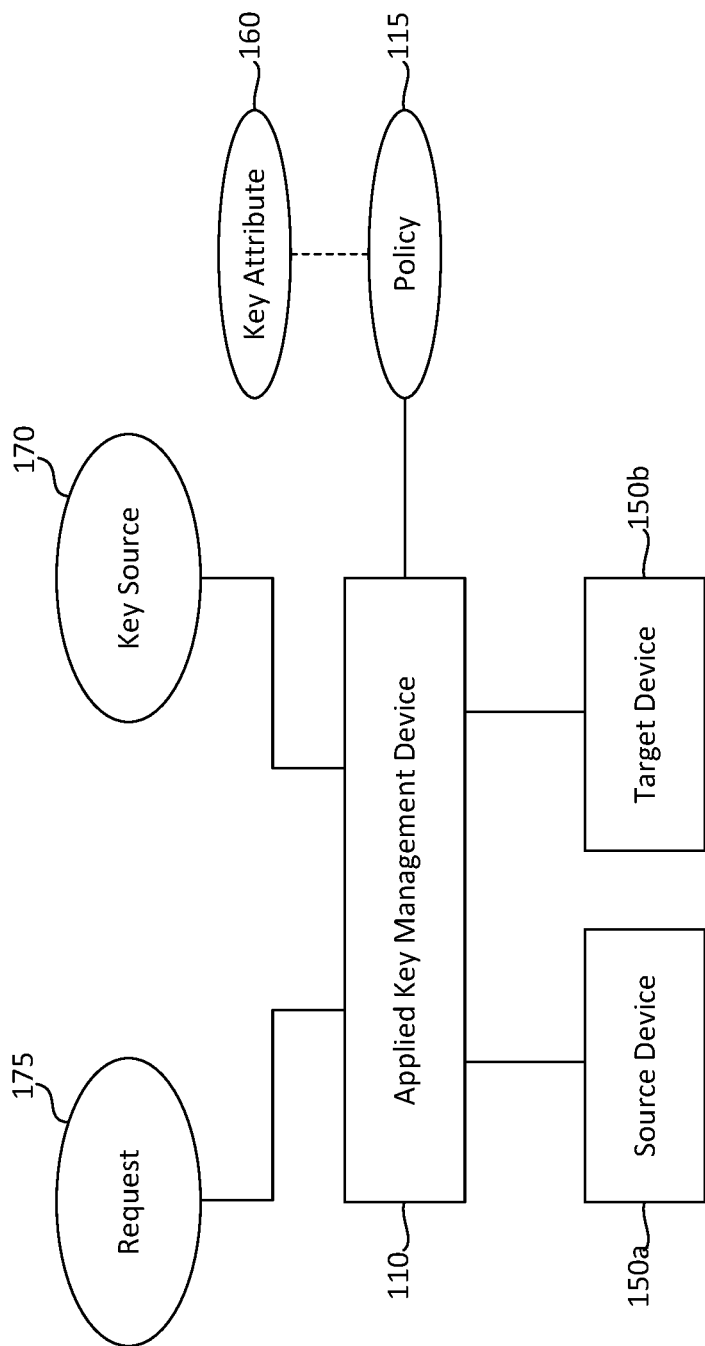
FIG. 1 is a schematic block diagram illustrating an example of a general applied key management system according to various embodiments.

In the following description of various embodiments, reference is made to the accompanying drawings which form a part hereof and in which are shown by way of illustration specific embodiments in which the embodiments may be practiced. It is to be understood that other embodiments may be utilized, and structural changes may be made without departing from the scope of the various embodiments disclosed in the present disclosure.

Embodiments described herein generally relate to security object applied key management. The security object applied key management may include management, distribution, and federation of the security object. Security objects may include encryption keys and other sensitive objects (such as, but not limited to, user identity information, certificates, biometric data, random number generator data, determinate random number generator data, non-determinate random number generator data, user authentication information, policy components, other components associated with organization security component, and/or the like). In the present disclosure, encryption key-based applied key management is described in various embodiments as examples of the security object applied key management systems and methods. It should be appreciated that the applied key management systems and methods are likewise applicable to other security objects, including those described above.

As used herein, "applied key management" may refer to a combination of key management, key federation, and key distribution activities in one or more enterprises. For example, embodiments described may be associated with the applied key management of encryption key information correlated with utilizing encryption in the one or more enterprises. "Enterprise key management" may include managing and/or overseeing the multiple uses of asymmetric and symmetric keys required for encrypting data, signing emails, authenticating web services, and/or other potential uses. This may also include encryption management for communications systems to include radio, cellular, satellite and internet protocol based communications. "Enterprise key federation" may include coordinating and negotiating the federation of key information to a plurality of disparate applied key management platforms (each associated with disparate federating organizations) based on established trust between the federating organizations (e.g., the enterprises). "Key distribution" may refer to a centralized distribution (e.g., pushing or forwarding) of key material to support encryption operations within a local enterprise and/or a foreign enterprise. In particular, key distribution may be concerned with assigning or otherwise transmitting the appropriate encryption keys to an appropriately associated device (e.g., the communication device, which may either be a source device or a target device).

Embodiments of applied key management (e.g., an applied key management device such as a management request handler coupled to a request handler and various supporting databases) may provide control of encryption key management, federation, and distribution through a centralized user interface. Such applied key management devices may provide centralized systems and/or methods of managing encryption keys associated with communications, infrastructure, and applications. Such applied key management devices may also manage device enrollment, monitor device health related to encryption capabilities, and monitor status for applied key management activities. Such capabilities may allow robust transaction reporting to support audit activities associated with communications, application, and infrastructure management.

Applied key management may be leveraged for additional systems other than the communication systems. Other implementations of applied key management may include application encryption management, virtualization encryption management, storage encryption management, and/or user identity encryption management. In short, if applications, communications, or infrastructures require use of encryption (or other types of security mechanisms using security objects) and keys (or security objects), applied key management may be applied to provide advantages as described. Communication systems may include, but are not limited to, radio communications, cellular communications, transmission control protocol/internet protocol (TCP/IP) based communications, satellite communications equipment, and the like. Application systems may include, but are not limited to voice-over-internet protocol VOIP applications, virtualization, identification and authentication, messaging, local storage. Infrastructure systems may include, but are not limited to storage solutions, physical security infrastructure, and medical equipment.

In particular embodiments, an applied key management device may enable encryption key lifecycle activities across multiple types of communication devices in a centralized manner. The applied key management device may leverage industry standards for key management for interoperability with existing systems and may use, for example, protocols for applied key management as a part of applied key management. A distinction between applied applied key management and key management alone may be demonstrated in encryption key management and key distribution for communication systems. Given the requirement to make new encryption connections before breaking existing connections, typical communication systems cannot utilize rekey commands as it would break communications before management steps are taken to establish new lines of communications. However, rekey commands may work for infrastructure—to include storage, applications and virtualization solutions—where services can be reestablished without loss of centralized control of the managed capability.

The system architecture of applied key management can be configured to allow for use of a standard-based approach for supported systems such as key management interoperability protocol (KMIP), for example, but also the capability to develop support interfaces for non-standardized systems such as physical security infrastructure, virtualization applications, satellite communications systems, and medical equipment. This may be accomplished by architecturally separating message handling from support interfaces. Using a purely KMIP example, a storage device may receive a "rekey" command, a communication equipment may receive "put-and-notify" commands, and cellular devices may request queued "notify" commands informing the cellular devices to send "get messages" to the applied key management device to be relayed to key management and generation system components. Example systems implementing such features are discussed below.

Embodiments described herein may include an applied key management device to implement centralized, top-down enterprise encryption key management encryption keys (e.g., such as, but not limited to symmetric key encryption, asymmetric key encryption, and the like) as well as other security objects used in security systems. Such centralized, top-down control of encryption may be for a given enterprise. Embodiments may include implementing coordinated KMIP on enterprise key management, communications systems, applications, and infrastructure for encryption key lifecycle functions implementing at least one of: device registration, user registration, system and user initialization, key material installation, key establishment, key registration, operational use, key storage, key distribution, key update, key recovery, key de-registration, key destruction, key revocation, and the like.

As referred to herein, a "key attribute" (attribute, encryption attribute, and/or the like) associated with an encryption key may refer to a characteristic associated with the encryption key, cryptographic or security characteristics of the encryption key, the cryptographic algorithms of the encryption key, a device generating/transmitting/receiving the encryption key, a user of the device, and/or the like. Each encryption key may be associated with at least one key attribute. The encryption key may be transmitted and/or received with its associated key attributes represented in data values.

As referred to herein, a "policy" may be a rule managing an encryption key based on key attribute(s) associated with that encryption key. In particular embodiments, a policy may dictate whether the particular encryption key is an acceptable encryption key. Such acceptability may be based on the security and cryptographic considerations as to whether the encryption key (e.g., as shown from the key attributes associated with the encryption key) may be secure enough. In other words, the encryption key generated for a particular communication transaction may be presented for inspection by the policy to be evaluated as to whether the encryption key is to be allowed or denied for that communication transaction.

Some embodiments include an interface for applied key management for mobile communication devices (e.g., a wireless device, and/or the like), or provide an interface for applied key management for radio/satellite communications systems to include telemetry and payload in satellite communications. Particular implementations of the embodiments may include interfaces for banking applications such as, but not limited to, automated teller machines (ATMs), bank account interfaces, and the like. The interfaces for banking applications may be implemented on any mobile or non-mobile devices. Embodiments may provide an interface for applied key management for applications that include virtualization or providing an interface for applied key management for network infrastructure to include routers, switches, virtual private network (VPN¬) appliances, firewalls, intrusion detection systems (IDSs), intrusion prevention system (IPSs), tokenizers, and/or the like.

For example, a centralized encryption management may be provided for symmetric encryption keys or asymmetric encryption keys, in both private and/or public contexts. In some embodiments, existing network infrastructure information may be consumed to distribute encryption keys based on active/inactive status of network infrastructure or distributing and managing encryption keys for network infrastructure based on equipment that can readily accept encryption keys (e.g., existing hardware/software may be installed on the equipment for accepting encryption keys).

Embodiments may queue encryption key transaction information for communication devices not available at the point of a given encryption management operation (e.g., in a push-key event). In addition, embodiments described herein may centrally display encryption key lifecycle information (for supported infrastructure) and successful encryption key management transactions. In addition to or as an alternative, failure message and/or a cause of unsuccessful encryption key management transactions may be displayed.

In some embodiments, a service interface for a communication device to acquire new asymmetric keys on a timed basis may be provided. In addition, a service interface for a communication device to acquire new symmetric keys on a timed basis may be provided. In some embodiments, a service interface for a communication device to acquire new asymmetric keys on user initiated basis may be provided. In various embodiments, a service interface for a communication device to acquire new symmetric keys on a user initiated basis may be provided. Also, federated distribution of encryption keys based on established trust based key exchange between two or more key management and applied key management devices may be provided as described.

In some embodiments, distributing federated symmetric key to local enterprise infrastructure based on configurations for federated symmetric key distribution may be provided. In various embodiments, distributing federated asymmetric key to local enterprise infrastructure based on configurations for federated asymmetric key distribution may be provided. In addition, implementing federated trust model by using multiple devices and split key distribution may be provided to establish trust between two untrusted entities that need to communicate securely.

The applied key management device (e.g., the management request handler and associated components) may include sub-modules including a business logic module, authentication and authorization module, policy enforcement module, system consistency/validation module, and/or the like for performing functions described herein.

FIG. 1 is a schematic diagram of an example of a general applied key management system 100 as implemented in various embodiments. In various embodiments, an applied key management device 110 may be coupled to at least one source device 150a and at least one target device 150b. The applied key management device 110 may include at least one desktop computer, mainframe computer, laptop computer, pad device, smart phone device or the like, configured with hardware and software to perform operations described herein. For example, the applied key management device 110 may include computation systems having suitable processing capabilities, memory, user interface (e.g., display and input) capabilities, and communication capabilities configured with suitable software to perform operations described herein. Thus, particular embodiments may be implemented, using processor devices that are often already present in many business and organization environments, by configuring such devices with suitable software processes described herein. Accordingly, such embodiments may be implemented with minimal additional hardware costs. However, other embodiments of the applied key management device 110 may relate to systems and processes that are implemented with dedicated device hardware/devices specifically configured for performing operations described herein.

Generally, the source device 150a may be a communication device transmitting data (or initiating communication) for which encryption (and therefore an encryption key) may be required or preferred. The target device 150b may be a communication device for receiving data that may have been encrypted (e.g., with an encryption key). According to various embodiments, the source device 150a and/or the target device 150b may be an ATM. The source device 150a and/or the target device 150b may also be any server or device for storing bank account information and executing banking functions. In particular embodiments, each of the source device 150a and the target device 150b may include a mobile smart phone (such as, but not limited to an iPhone™, an Android™ phone, or the like) or other wireless mobile communication devices with suitable processing and encryption capabilities. Typical modern mobile communication devices include telephone communication electronics as well as some processor electronics, one or more display devices and a keypad and/or other user input device. In further embodiments, each of the source device 150a and the target device 150b may include any suitable type of mobile phone and/or other type of portable electronic communication device, such as, but not limited to, an electronic smart pad device (such as, but not limited to an iPad™), a portable computer, or the like. It should be noted that an encryption key may originate from either the source device 150a or the target device 150b, and/or both. In other words, either of the source device 150a or the target device 150b may be a key source 170. The source device 150a and the target device 150b may be associated with a same enterprise or separate enterprises. In other embodiments, one or both of the source device 150a and the target device 150b may be a wired device suitable for communication with a wired or wireless device.

In some embodiments, the applied key management device 110 may be a part of the enterprise associated with the source device 150a and target device 150b. An enterprise may be an organization or security unit having dominance over at least one source device 150a and/or target device 150b. With respect to communication between the source device 150a and the target device 150b associated with disparate enterprises, the source device 150a may be associated with a first enterprise and the target device 150b may be associated with a second disparate enterprise. An enterprise may be a company, subgroup within a company, autonomous and independent entity, a communication group, security provider, various entities, organizations, and/or the like. Each applied key management device 110 may perform applied key management activities for a plurality of devices such as the source device 150a and the target devices 150b, establishing a hierarchical model for applied key management.

In other embodiments, the applied key management device 110 may be a third party server coupled to the enterprise associated with the source device 150a and/or target device 150b. Thus, various embodiments may affect centralization of applied key management with existing communication systems and protocols of the enterprise. In other words, the applied key management device 110 may be implemented to cooperate with the existing encryption technology for communications, applications, and infrastructure. Applied key management (e.g., by a third party or otherwise) may interact with both the sources and targets of key information (e.g., the encryption key and the associated key attributes 160). Accordingly, a top-down control of applied key management may be achieved, while maintaining a request model in which the source device 150a and the target device 150b may request key information.

In some embodiments, a key source 170 may be coupled to the applied key management device 110. The key source 170 may be any source by which an encryption key (or any other types of security objects) may be generated. In some embodiments, the key source 170 may be a part of the applied key management device 110 (e.g., a module or database within the applied key management device 110 or coupled to the applied key management device 110). In other embodiments, the key source 170 may be a source external to the applied key management device 110. The key source 170 may include the source device 150a and/or the target device 150b, one or more of which may be capable of generating encryption keys for the communication therebetween. Alternatively or additionally, the key source 170 may be a key-generating device (other than the source device 150a and the target device 150b) internal or external to the same enterprise as the source device 150a and/or the target device 150b. In these cases, the key source 170 may be an existing specialized key generating device implemented separately from the applied key management device 110 (e.g., the key generation and management device 230 of FIG. 2). Other examples of the key source 170 may include a management user interface 220 of FIG. 2 (e.g., encryption keys may be generated manually through the management user interface 220), a key federation interface 260 of FIG. 2 (e.g., encryption keys generated from a disparate enterprise), various databases storing generated encryption keys, and/or the like.

In various embodiments, a request 175 may be sent to the applied key management device 110. The request 175 may be a request to generate an encryption key. For example, the applied key management device 110 may itself generate (or retrieve from a database coupled to the applied key management device 110) encryption keys in response to the request 175. In other examples, the applied key management device 110 may request an encryption key from other devices (e.g., the key source 170) within the same or a disparate enterprise.

The request 175 may originate from the source device 150a, the target device 150b, the applied key management device itself 110, a third-party device within the same enterprise (e.g., the management user interface 220, the key management interface 240, and the like), a third-party device in a disparate enterprise (e.g., from the key federation interface 260 of FIG. 2), and/or the like. Embodiments of the applied key management device 110 may therefore serve as an intermediary device between the source device 150a, the target device 150b, the requesting device (which issues the request 175), the key source 170, and/or the like. Accordingly, key management, distribution, and federation may effectively be managed for various devices in a same or disparate enterprise.

Various components within the general applied key management system 100 (e.g., the applied key management device 110, the source device 150a, the target device 150b, the applied key management device itself 110, the device that issues the request 175, the key source 170, and/or the like) may be connected via any suitable wired or wireless network. The network may be secured or unsecured. For example, the network may be a wide area communication network, such as, but not limited to, the internet, or one or more intranets, local area networks (LANs), ethernet networks, metropolitan area networks (MANs), a wide area network (WAN), combinations thereof, or the like. In particular embodiments, the network may represent one or more secure networks configured with suitable security features, such as, but not limited to firewalls, encryption, or other software or hardware configurations that inhibits access to network communications by unauthorized personnel or entities.

In some embodiments, key attributes 160 may refer generally to characteristics associated with the encryption key itself, characteristics of a device associated with the encryption key, and/or the like. In other words, the key attributes 160 may refer to when, where, how, for what, with what device the encryption key has been or is about to be generated. Examples of the key attributes 160 may include, but not limited to, encryption key size, a classification of the encryption key, a time at which the encryption key has been or about to be generated (e.g., by the key source 170), a location in which the encryption key has been or about to be generated (e.g., by the key source 170), a role associated with the key source 170, a role associated with the source device 150*a*, a role associated with the target device 150*b*, a role associated with a key generating/storage device, a role associated with a user of the source device 150*a*, the target device 150*b*, the key generating/storage device, the source 170, a combination thereof, and/or the like.

In some embodiments, the key attributes 160 may include the key size. Typically, the larger the key size (i.e., the longer the encryption key), the more security it may provide for the communication. The key attributes 160 may also include the classification of the encryption key. In various embodiments, the classification of the encryption key may refer to its utilization e.g., what the encryption key may be used for. Examples of the utilization may include (e.g., for communication systems) whether an encryption key is a global hopping key, whether the encryption key is a secret key, whether the encryption key is symmetrical or asymmetrical, a combination thereof, and/or the like.

In some embodiments, the key attributes 160 may include a time and/or location at which the encryption key has been or about to be generated. As described, the time and/or location at which the encryption key may be generated may be defined from the perspective of the source device 150*a*, the target device 150*b*, and/or any other key sources 170. For example, when an encryption key is generated (and/or sent, received), a corresponding time of the device (e.g., the key sources 170) generating (and/or sending, receiving) the encryption key may be determined. The encryption key may be transmitted/stored with a time stamp representing the time. Similarly, when an encryption key is generated (and/or sent, received), a corresponding geo-location of the device (e.g., the key sources 170) generating (and/or sending, receiving) the encryption key may be determined. The encryption key may be transmitted/stored with the geo-location.

In various embodiments, the key attributes 160 may include role(s) associated the source device 150*a*, the target device 150*b*, the key source 170, the other key generating/storage device, as well as their associated user. Particularly, a role may refer to a group/classification (e.g., based on predefined assignment, time, geo-location of the device, whether the device is generating encryption keys, whether the device is transmitting the encryption key, whether the device is receiving the encryption keys, and/or the like) in which the device/user is assigned to, a level of security clearance, the type of the device/user, a combination thereof, and/or the like. In particular examples, each device/user may be associated with at least a security group (e.g., assigned to a server). Within each security group, subgroups may exist to further subdivide the devices/users. The groups/subgroups may be predetermined by any suitable personnel. In other or further embodiments, the groups/subgroups may be defined when the encryption key is generated (e.g., based on current characteristics of the device such as geo-location, time of the day, and/or the like).

It should be appreciated by one of ordinary skill in the art that one or more key attributes 160 may be associated with a given encryption key. In fact, as implemented in various embodiments, an encryption key may be associated with a plurality of key attributes 160. The encryption key may be transmitted along with the associated key attributes 160 to a device (e.g., the applied key management device 110). The encryption key and the key attributes 160 associated with the encryption key may be inspected according to at least one policy related to the key attributes 160. Such process may be referred to as "shooting" the key attributes 160 against the relevant policies or "presenting" the key attributes 160 for "inspection" by the policy.

The encryption keys may generally be managed by a set of policies 115. As implemented in various embodiments, a policy may refer to at least one defined rules governing the criteria for the key attributes 160. In some embodiments, a policy engine (e.g., as embedded in the applied key management device 110 and/or other devices as described herein) may receive the encryption key and the key attributes 160 associated with the encryption key as input. The policy engine may output a response as to whether the encryption key may be allowable based on the key attributes 160. In particular embodiments, the policy engine may output a binary response (e.g., accepted or denied).

The encryption key and the associated key attributes 160 may be presented for inspection one or more times per communication transaction. In some embodiments, the encryption key and the associated key attributes 160 may only be required to be presented for inspection by policy 115 once per communication transaction (e.g., at the initiation stage before the communication transaction has taken place but after the encryption key has been generated). In other or further embodiments, the encryption key and the associated key attributes 160 may be required to be presented for inspection by the policies 115 periodically and/or every time the encryption key has been altered for a given communication transaction. In some case several encryption keys may be presented for inspection by the policies 115 for a given communication transaction.

The policy engine may identify the key attributes 160 received. The policy engine may retrieve relevant policy 115 from a local or remote storage database. In other embodiments, the policy engine may inspect particular key attributes 160 (or sometimes all key attributes 160) associated with the encryption key as the policy engine determines acceptability based on the predefined set of policies 115. For example, the policy engine may determine, based on the relevant policy 115, whether the encryption key should be accepted for the communication transaction for which the encryption key may be generated.

In one non-limiting example, the policies 115 may dictate that a size of the encryption key must be within a predetermined range (e.g., the size of the encryption key must exceed and/or be below 128 bits, 192 bits, 256 bits, and/or the like). In some cases, the policy 115 may dictate that the size of the encryption keys must be a particular key size (e.g., 256-bit, and/or the like).

The policies 115 may require that the geo-location attribute of the key attributes 160 to be associated with (or not associated with) a predetermined location and/or within (or not within) a predetermined area. For example, when the geo-location attribute of the encryption key (e.g., as defined by the geo-location of the generating, transmitting, and/or receiving device of the encryption key) is associated with a "danger" zone, the policy engine may deny the encryption key. This is because there may be a high likelihood that the encryption key may be compromised in the danger zone. On the other hand, when the geo-location attribute of the encryption key is associated with a "safe" zone, then the encryption key may be allowed for the communication transaction. This is because there may be at most a low likelihood of included security keys. In further embodiments, a "neutral" zone may be a safe zone, or, in the alternative, a zone associated with an intermediate likelihood of included security keys.

In another non-limiting example, the policies 115 may require the time attribute of the key attributes 160 to be within (or not within) a predetermined time period. The policy 115 may deny the encryption key on the basis that the time attribute (e.g., a time stamp) associated with the creation, transmission, and/or reception of the encryption key may be outside of a predetermined time period (for example, at 3:00 am, where acceptable creation, transmission, and/or reception time of the encryption key may be between 9:00 am-5:00 pm).

In various embodiments, the policies 115 may allow the encryption key, when the role attribute of the key attributes 160 is associated with the encryption key generating/transmitting/receiving device (and the device's associated user) is within a predetermined accepted group. In some examples, the source device 150a (the target device 150b or other source devices 170) associated with a first security group within an enterprise may generate an encryption key and present the encryption key for inspection by the policy 115. The policy engine may determine whether the first security group may be a part of the accepted group. When the policy engine determined that the source device 150a (the target device 150b or other source devices 170) is a part of the accepted group (e.g., the first security group falls within the accepted group), the encryption key may be allowed for the communication transaction for which the encryption has been created for.

It should be appreciated by one of ordinary skill in the art that a plurality of policies 115 may act in concert for a comprehensive encryption key management scheme. This means that, the plurality of policies 115, each of which may regulate at least one disparate key attribute 160, may be aggregated into a set of policies 115 for regulating encryption keys presented to the policy engine.

In other examples, other key sources 170 (e.g., other than the source device 150a and the target device 150b) may generate an encryption key to be distributed (or pushed) to the source device 150a and/or the target device 150b for a communication transaction between those devices. The policy engine (e.g., the applied key management device 110) may inspect the key attributes 160 to determine whether the encryption key is allowable. In response to the encryption key being determined to be allowable, the applied key management device 110 may determine to distribute the encryption key to the source device 150a and/or the target device 150b for the communication transaction.

In various embodiments, when the policy engine denies the encryption key, the policy engine may transmit a rejection indicator (e.g., a "denied" message) to the key source 170. The key generating device may redesign a second encryption key to be presented (along with the key attributes 160 associated with the second encryption key) to the policy engine for a second round of inspection. In other embodiments, when the policy engine denies the encryption key, the policy engine may transmit a "denied" message to the key source 170 along with a cause of failure (e.g., a hint) as to which the key attribute 160 caused the denial and/or what it should be.

For example, an encryption key with key attributes 160 including a time attribute of 4:49 am, geo-location attribute of "safe zone," and role attribute of "security group A" may be presented to a set of policies 115. The policy engine may allow the encryption key when the encryption key is generated between 5:00 a.m.-9:00 p.m., in either a "safe zone" or a "neutral zone," and for security groups A-C. Such encryption key may be denied, given that it is not generated between 5:00 a.m.-9:00 p.m. The policy engine may transmit the "denied" message along with a time attribute hint (e.g., to generate the encryption key after 5:00 a.m., in 11 minutes).

Accordingly, the applied key management device 110 may be configured to manage encryption keys and distribute the encryption keys. In other words, the applied key management device 110 may serve as an intermediary between the source devices 150a, the target devices 150b, other key sources 170, and/or the like as these devices themselves may lack the capability to distribute and manage encryptions in the manner set forth with respect to the applied key management device 110. The applied key management device 110 may include a plurality of modules (or may be coupled to remote modules) for each feature as described herein. In addition, the general applied key management system 100 may be coupled with at least one other similar general applied key management system 100 to make up the encryption key federation scheme as described herein.

Figure 2:
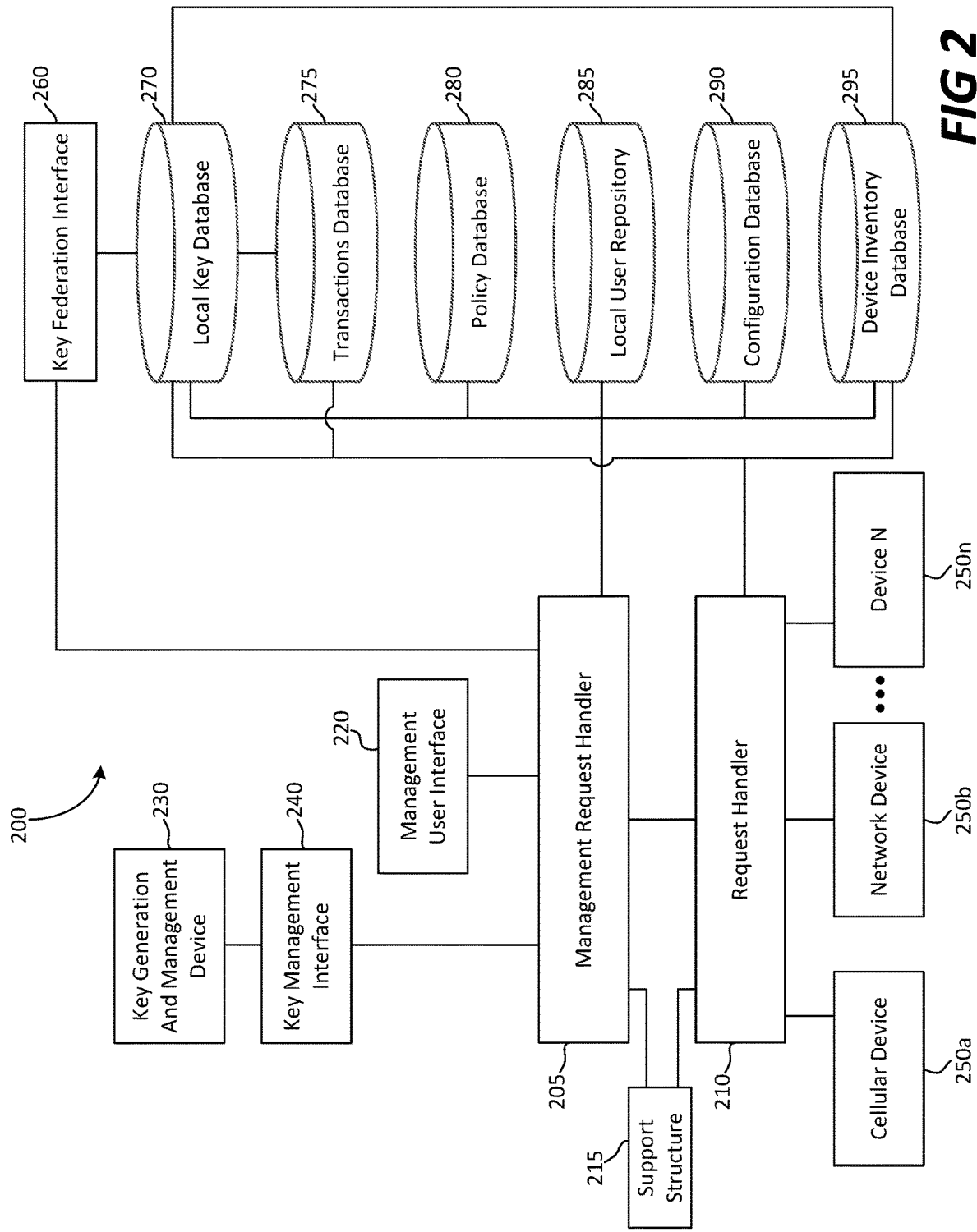
FIG. 2 is a schematic block diagram illustrating an example of an applied key management system according to various embodiments.

FIG. 2 is schematic diagram illustrating an example of an applied key management system 200 according to various embodiments. In some embodiments, the applied key management system 200 may illustrate a particularized implementation of the general applied key management system 100. From an architectural perspective, embodiments as illustrated for the applied key management system 200 may be centered around message handling and interoperability with key generation technology, other applied key management devices, supported communications systems, applications, and infrastructure.

The applied key management device 110 may include at least a management request handler 205, a request handler 210, a support structure 215, a key federation interface 260, as well as the associated databases (e.g., a local key database 270, transactions database 275, policy database 280, local user repository 285, configuration database 290, device inventory database 295).

In various embodiments, the management request handler 205 may include (or is) the policy engine that may be implemented for policy-based encryption key management, distribution, and federation. As the management request handler 205 can be an intermediary layer between the various components described, rapid integration of the policy-based encryption key management, distribution, and federation may be added to an existing system without having to make changes to the system level message handling. The management request handler 205 may provide a top-down management for various communication devices (e.g., a cellular device 250*a*, a network device 250*b*, . . . , a device N 250*n*, and/or the like) associated with a given enterprise. In various embodiments, each of the cellular device 250*a*, the network device 250*b*, . . . , and the device N 250*n* may be the source device 150*a* or the target device 150*b* depending on the particular communication transaction for which the encryption key is generated.

The management request handler 205 and the request handler 210 may be of an agent-interface relationship. That is, the request handler 210 may serve as the interface between the management request handler 205 and the various communication devices associated with the enterprise (e.g., the cellular device 250*a*, the network device 250*b*, . . . , the device N 250*n*, and/or the like). The communication between the management request handler 205 and the request handler 210 may be facilitated by the support structure 215. The support structure 215 may provide suitable communication protocol, management application, infrastructure, communication application program interface (API), configurations, translations, and/or the like for interfacing between the management request handler 205 and the request handler 210.

The request handler 210 may receive key generating requests 175 and/or encryption keys from the various communication devices and relate them to the management request handler 205 with the assistance from the support structure 215. The request handler 210 may also relate the response of the management request handler 205 (including the hint in some embodiments) and/or encryption keys to the various communication devices with the assistance from the support structure 215.

In various embodiments, the management request handler 205 may receive the request 175 for generating an encryption key. Various components may be capable of transmitting the request 175 to the management request handler 205. The some embodiments, the management request handler 205 may receive the request 175 from the various communication devices associated with the enterprise (e.g., the cellular device 250*a*, network device 250*b*, . . . , device N 250*n*, and/or the like). The request 175 may be related by the request handler 210, which may serve as the interface between the devices and the management request handler as described. The key federation interface 260, the management user interface 220, and the key management interface 240 may also transmit the request 175 to the management request handler.

In non-request-driven embodiments, the management request handler 205 may receive encryption keys from at least one key source 170. The key source 170 may be the key generation and management device 230, which may be any suitable existing encryption key generating apparatus implemented within the enterprise. In other words, the key generation and management device 230 may represent any existing schemes internal or external to the communication systems of the enterprise. For example, the key generation and management device 230 may be any suitable native protocol associated with safe net equipment.

Embodiments of the key management interface 240 may represent an internal integration of key generation and key management capabilities as well as an external interface with existing solutions. This is because the key management interface 240 may be poised between the key generation and management device 230 (which may generate encryption keys) and the management request handler 205 (which inspects key attributes 160 of the encryption keys based on policies 115). For example, the key management interface 240 may be a translation interface that maintains a standard encryption management messaging language with the applied key management device 110. This can allow enterprise interoperability between existing solutions (e.g., the key generation and management device 230) and the applied key management platform (e.g., the management request handler 205). Accordingly, the policy-based applied key management systems and methods may be implemented with various types of security object (e.g., encryption key) generation protocols.

Additionally or alternatively, in request-driven embodiments, the management user interface 220 may transmit the request 175 to the management request handler 210. The management user interface 220 may utilize the same API as other components described herein to assure interoperability. The management user interface 220 may include suitable user input and display devices to receive and display data to a designated managing user. In particular embodiments, the management user interface 220 may include a mobile device such as a smartphone or a tablet. The management user interface 220 may also include a wired device.

In some embodiments, the key federation interface 260 may transmit the request 175 to the management request handler 205. The key federation interface 260 may be in communication with a second key federation interface (such as, but not limited to, the key federation interface 260) associated with a disparate enterprise (which may utilize the same or similar applied key management systems and methods described). When one of the various communication devices (e.g., the cellular device 250*a*, network device 250*b*, . . . , device N 250*n*, and/or the like) wishes communicate with another device from the disparate enterprise (or vice versa), the request 175 may be transmitted (from the key federation interface 260 of the second enterprise) to the key federation interface 260 of the current enterprise. In some embodiments, the request 175 may be directly transmitted to the management request handler 205 when the key federation interface 260 has designated the relationship between the enterprises to be trusted.

In some embodiments, instead of or in addition to the request 175, encryption keys as well as the "allowed" and "denied" messages may be transmitted and received between the key federation interface 260 (of the current and the second enterprise). The encryption key and its associated attributes 160 may be stored in the local key database 270, which may be accessible by the management request handler 205 (for policy inspection) and/or the request handler 210 (for distribution).

The request 175 may be transmitted with further instructions related to generating the encryption key. The further instructions include, but are not limited to, a source of encryption keys, the encryption keys themselves, key attributes 160 associated with the encryption keys, and/or the like.

In various embodiments, in response to receiving the request 175, the management request handler 205 may generate or facilitate the generation of the encryption key. For example, where the request 175 may be silent as to where the encryption key is to be generated (e.g., the key source 170), the management request handler 205 itself may generate the encryption key. The management request handler 205 may generate the encryption key based on the set of policies 115 stored in the policy database 280. In other words, the management request handler 205 may generate the encryption keys with key attributes 160 that would not have violated any policies 115 set forth in the policy database 280.

Where the request 175 may be silent as to where the encryption key is to be generated (e.g., the key source 170), or specifies that a particular key source 170 to generate the encryption key, the management request handler 205 may retrieve or otherwise request the encryption key from a suitable key source 170. The management request handler 205 may request encryption keys from the management user interface 220, the key federation interface 260, the communication devices (e.g., the cellular device 250a, network device 250b, . . . , device N 250n, source device 150a, and target device 150b), key management interface 240, and/or the like.

The management request handler 205 may retrieve encryption keys from a designated database storing encryption keys (e.g., the local key database 270). The local key database 270 may be coupled to other key sources 170 (e.g., the cellular device 250a, network device 250b, . . . , device N 250n, source device 150a, target device 150b, the key generation and management device 230 the key federation interface 260, and/or the like) and store cached encryption keys on behalf of the other key sources 170. The management request handler 205 may retrieve encryption keys from the local key database 270 instead of requesting encryption keys from the key sources 170. This is so that transaction time for retrieving/generating the encryption key may be improved, and that network problems would not hinder the ability of the management request handler 205 to obtain encryption keys, given that the local key database may be local to (e.g., residing on a same network node) the management request handler 205. As the management request handler 205 is retrieving encryption keys from the local key database 270, a verification request may be sent to the key source 170 to ensure whether the encryption key to be retrieved has been altered by the key source 170. A confirmation or an updated encryption key may be sent to the local key database 270 in response, so that the management request handler 205 may accordingly receive the encryption key.

In some embodiments, the management request handler 205, upon receiving encryption keys (whether requested or not) in any manner as described, may cache the encryption key along with the key source identifier and the associated key attributes 160 at the local key database 270. The encryption key, the key source identifier, and the key attributes 160 may be stored in case that the communication is lost or when the encryption key source of the encryption key is not authoritative. Whereas in some embodiments, the encryption key may not be transmitted with the key attributes 160. In such embodiments, the management request handler 205 may determine the key attributes 160 from various sources such as, but not limited to, the local user repository 285, the device inventory database 295, and/or the like.

The management request handler 205 may then inspect the key attributes 160 associated with the encryption key received based on the set of policies 115 stored in the policy database 280. The management request handler 205 may retrieve all policies 115 or only the relevant policies (e.g., based on some or all key attributes 160) from the policy database 280. In some embodiments, the encryption keys generated by the management request handler 205 or at the direction of the management request handler 205 may be spared from inspection by policies 115 when they are created based on the policies 115. In other embodiments, all encryption keys generated by the management request handler 205 or at the direction of the management request handler 205 may be inspected by the policies 115. Encryption keys allowable based on the policies 115 may be allowed while unacceptable encryption keys may be denied, in the manner described. The management request handler 205 may be configured to update or add policies stored in the policy database 280 (e.g., as directed by the management user interface 220).

The local user repository 285 may be a database storing information related to local users of the communication devices (e.g., the cellular device 250a, network device 250b, . . . , device N 250n, and/or the like) within the enterprise. In various embodiments, the local user repository 285 may store characteristics/information of the users that would constitute key attributes 160. The characteristics include, but not limited to, privileges, security groups, assigned roles, a combination thereof, and/or the like. The security groups may be stored in a hierarchical tree. The management request handler 205 may access the local user repository 285 for such characteristics and utilize them as key attributes 160 associated with encryption keys requested, transmitted, or received by that device corresponding to such characteristics. The management request handler 205 may add or alter information stored in the local user repository 285. A copy of the information stored in the local user repository 285 may be sent to the local key database 270 as key attributes 160 to be stored in the local key database 270.

In some embodiments, the transaction database 275 may store various communication transactions or potential communication transactions. In some embodiments, the transaction database 275 may store encryption key transmission instances (i.e., instances where encryption keys are to be distributed) to one or more devices. For example, when a particular encryption key cannot/should not be forwarded (e.g., pushed to a communication device) for any reason, the forwarding transaction (e.g., a job) may be queued or otherwise stored within the transactions database 275 for forwarding the encryption key at a later some. The transaction database 275 may also store a status of each particular encryption key transmission instance, which may later be read by the request handler 210. For example, the request handler 210 may at a later time attempt to transmit all or some encryption keys to corresponding communication devices for all "unsent" encryption key transmission instances. The transactions database 275 may be coupled to the local key database 270 to gain access of the keys to be forwarded to each communication device that the encryption key may be generated for.

In further embodiments, the transaction database 275 may be coupled to the request handler 210 and may store the communication transactions (for which the encryption key may be requested, transmitted, or received) and/or the associated key attributes 160. For example, the request handler 210 may transmit such information to the transactions database 275. The transaction database 275 may be coupled to the local key database 270. The communication transactions (as the associated details) may be associated with the encryption keys stored in the local key database 270. The management request handler 205 may need to access only the local key database 270 for the encryption keys and the associated key attributes 260.

The configuration database 290 may store supporting instructions for the key applied key management system 200. In some embodiments, the configuration database 290 may store internal network, configuration of clients, configuration of applications, IP address allocations, various component configurations, device privileges, device communication pathways, credentials, and/or the like. The configuration database 290 may be coupled to the management request handler 205, which may require the instructions stored within the configuration database 290 for operations. The management request handler 205 may also add or alter the information stored in the configuration database 290.

In some embodiments, the device inventory database 295 may store information related to the communication devices associated with the given enterprise. For example, information stored may include, but not limited to, security group, security level, geo-location, identification number, internal classification, device specifications, time stamp in which an encryption has been created, a combination thereof, and/or the like. The request handler 210 may be coupled to the device inventory database 295 to store such data therein. The management request handler 205 may be coupled to the device inventory database 295 for accessing such device information. The device inventory database 295 for associating particular cached keys with the corresponding device information as key attributes 160. A copy of the information stored in the device inventory database 295 may be sent to the local key database 270 as key attributes 160.

The key federation interface 260 may allow one applied key management device 110 to federate encryption key information with one or more other applied key management devices 110 (through their associated respective key federation interfaces 260) based on an established trust relationship. Each enterprise may include by an applied key management device 110. As such, the key federation interface 260 may maintain a trust relationship with the communication systems of at least one other enterprise. It is, in other words, a gateway to extend trust.

Figure 3:
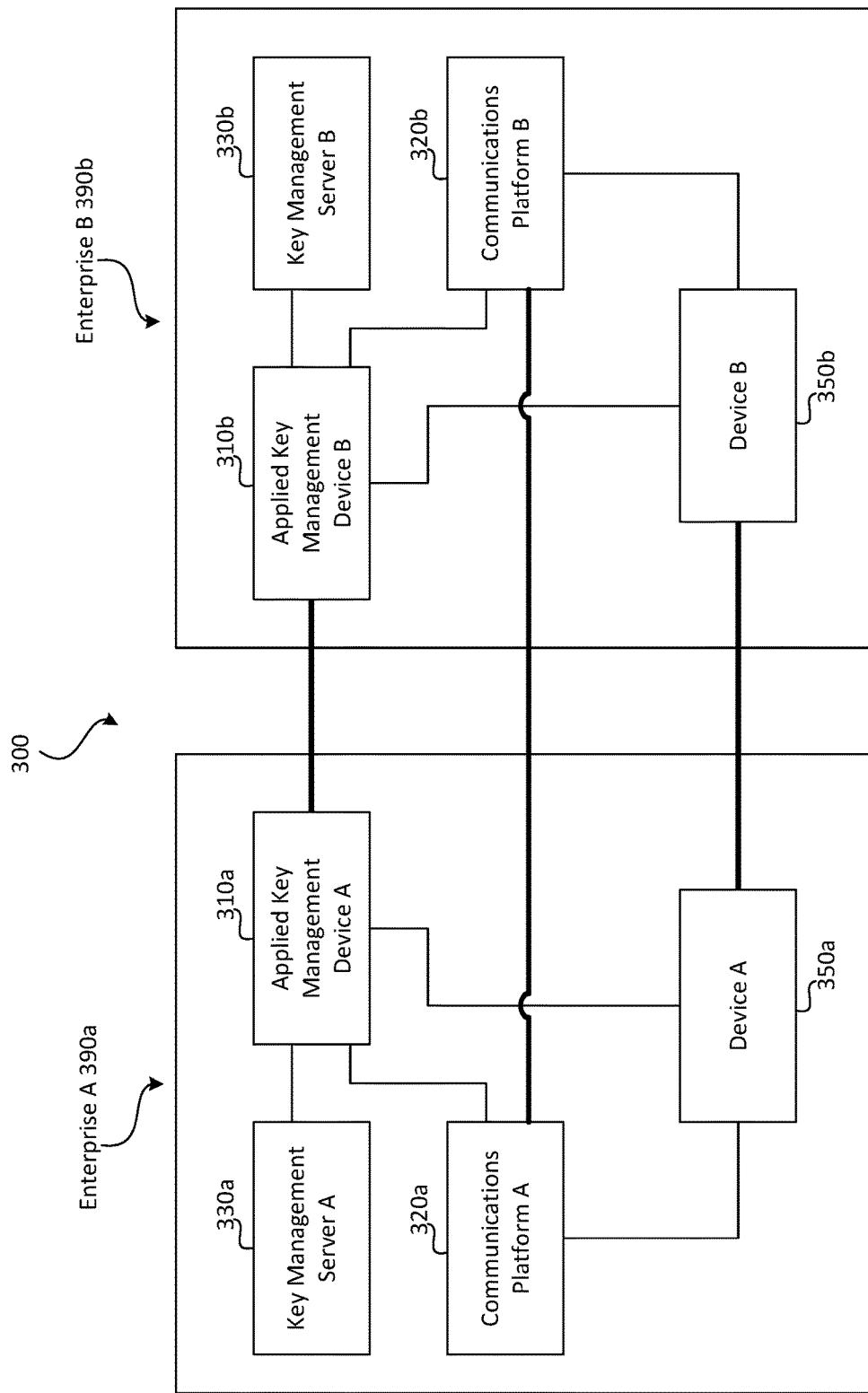
FIG. 3 is a schematic block diagram illustrating an example of an encryption key federation system as implemented in various embodiments.

FIG. 3 illustrates an example of an encryption key federation system 300 as implemented in various embodiments. The key federation system 300 may implement the applied key management device 110 as set forth with respect to FIGS. 1-2. The key federation system 300 may be based on extra-enterprise communication relationship and key federation enabled by the applied key management device 110 (e.g., the management request handler 205 and the associated components).

Encryption keys (e.g., asymmetric encryption keys, symmetric encryption keys, and/or the like) generated by components within one enterprise (e.g., enterprise A 390a) may be distributed to a disparate applied key management device (e.g., the applied key management device 110, the management request handler 205, and its associated components, and/or the like) of another enterprise (e.g., enterprise B 390b) pursuant to inspection by the policies 115 of either (or both) enterprises. This can enable secured communications or data exchange with outside entities (e.g., enterprises) based on the federated trust model. This can also allow encryption management to parallel communications management in supporting external communications to enable symmetric key encryption for communications. Accordingly, performance of the communications platform may be improved, given that utilization of asymmetric encryption may be expensive from a processing perspective as compared to symmetric encryption.

In the key federation system 300, each enterprise (e.g., the enterprise A 390a or the enterprise B 390b) may be associated with a respective one of an applied key management device A 310a and an applied key management device B 310b). Each of the applied key management device A 310a and the applied key management device B 310b may be the applied key management device 110. The applied key management device A 310a and the applied key management device B 310b may be in communication with one another through any suitable network. In particular, the key federation interfaces (e.g., the key federation interface 260) of each of the applied key management device A 310a and the applied key management device B 310b may be in communication with one another.

In various embodiments, the key management server A 330a and the key management server B 330b may be a device such as, but not limited to, the key generation and management device 230 and the key management interface 240. Each of the key management server A 330a and the key management server B 330b may be coupled to their respective key federation interfaces 206 within their respective enterprises in the manner described.

A device A 350a and a device B 350b may attempt to obtain an encryption key for the communication therebetween. Each of the device A 350a and the device B 350b may be the source device 150a, the target device 150b, the cellular device 250a, the network device 250b, . . . , the device N 250n, a combination thereof, and/or the like.

An encryption key may be generated within one enterprise (e.g., enterprise A 390a) from any suitable key source 170 in the manner described. The encryption key may be generated by the enterprise A 390a (e.g., by a key source 170 in the enterprise A 390a) with or without a request 170 from either enterprise B 390b or within enterprise A. The encryption key may likewise be generated by the enterprise B 390b in a similar manner. The encryption key and its associated key attributes 160 may be presented to the policy engine of enterprise A 390a (e.g., the applied key management device A 310a, which may include the management request handler 205 and its associated components) for inspection in the manner described. In response to the policy engine of enterprise A 390a determining the encryption key is accepted based on the encryption key attributes 160, the applied key management device 310a (e.g., the key federation interface 260) of enterprise A 390a may relate the encryption key as well as its associated key attributes 160 to the applied key management device B 310b (e.g., the key federation interface 260) of enterprise B 390b.

Upon receiving the encryption key and its associated key attributes 160, the encryption key and its associated key attributes 160 may be presented to the policy engine of enterprise B390b (e.g., the applied key management device B 310b, which may also include the management request handler 205 and its associated components) for inspection in the manner described. The encryption key may be forwarded to both the device A 350a and the device B 350b when the applied key management device B 310b determines that the encryption key is consistent with its policies 115 defined for enterprise B 390b. In other words, the encryption key (as defined by its key attributes 160) may be allowed only if it is consistent with both sets of policies 115 of enterprise A 390a as well as enterprise B 390b. At least some of the set of policies 115 of enterprise A 390a may be different from at least some of the set of policies 115 of enterprise B 390b. Whereas the encryption key is found not allowable by either the applied key management device A 310a or the applied key management device b 310b, the encryption key may be returned back to the key source 170 with the "denied" message and/or the hint in the manner described.

In other embodiments, acceptance by policies 115 associated with only one enterprise (e.g., either enterprise A 390a or enterprise B 390b) may be sufficient for encryption key to be allowed. In such cases, the trust extends to some or sometimes all of the policies 115. In addition, each enterprise may include a set of policies 115 for the federated instances (e.g., each enterprise may have agreed with the other regarding a set of policies 115 used when communications between the communication devices of the enterprises are to occur. Accordingly, each enterprise may store (e.g., in each respective policy database 280) a same set of federated (mutual and reciprocal) policies for the federated schemes. The federated policies may be the same for both the enterprise A 390a and the enterprise B 390b. Thus, allowance by one applied key management device associated with one enterprise may be sufficient for the encryption key to be forwarded for usage for communication between both enterprises.

In various embodiments, enterprise federation policies may be stored within each policy database 280. The enterprise federation policies may specify the manner in which the encryption keys may be federated. For example, the enterprise federation policies may specify the federated policies, which applied key management device may inspect the key attributes 160, which enterprise may issue a request 175 for an encryption key, which enterprise may generate an encryption key, a combination thereof, and/or the like. The enterprise federation policies allow flexibility in policy defining. For example, the enterprise federation policies may specify that enterprises may each include its own policies 115 in addition to the federated policies, where at least a part the policies 115 of each enterprise may be disparate.

In some embodiments, a communication platform A 320a and a communication platform B 320b of each respective enterprise may be in communication with one another via any suitable network. Such communication between the communication platforms may be encrypted communications, where the encryption key corresponding to such communication may also be presented for inspection by policies 115 similar to described with respect to the devices (e.g., the device A 350a, the device B 350b, and/or the like). Each communication platform may be in communication to a respective device, such that configurations related to the applied key management systems may be exchanged.

Figure 4:
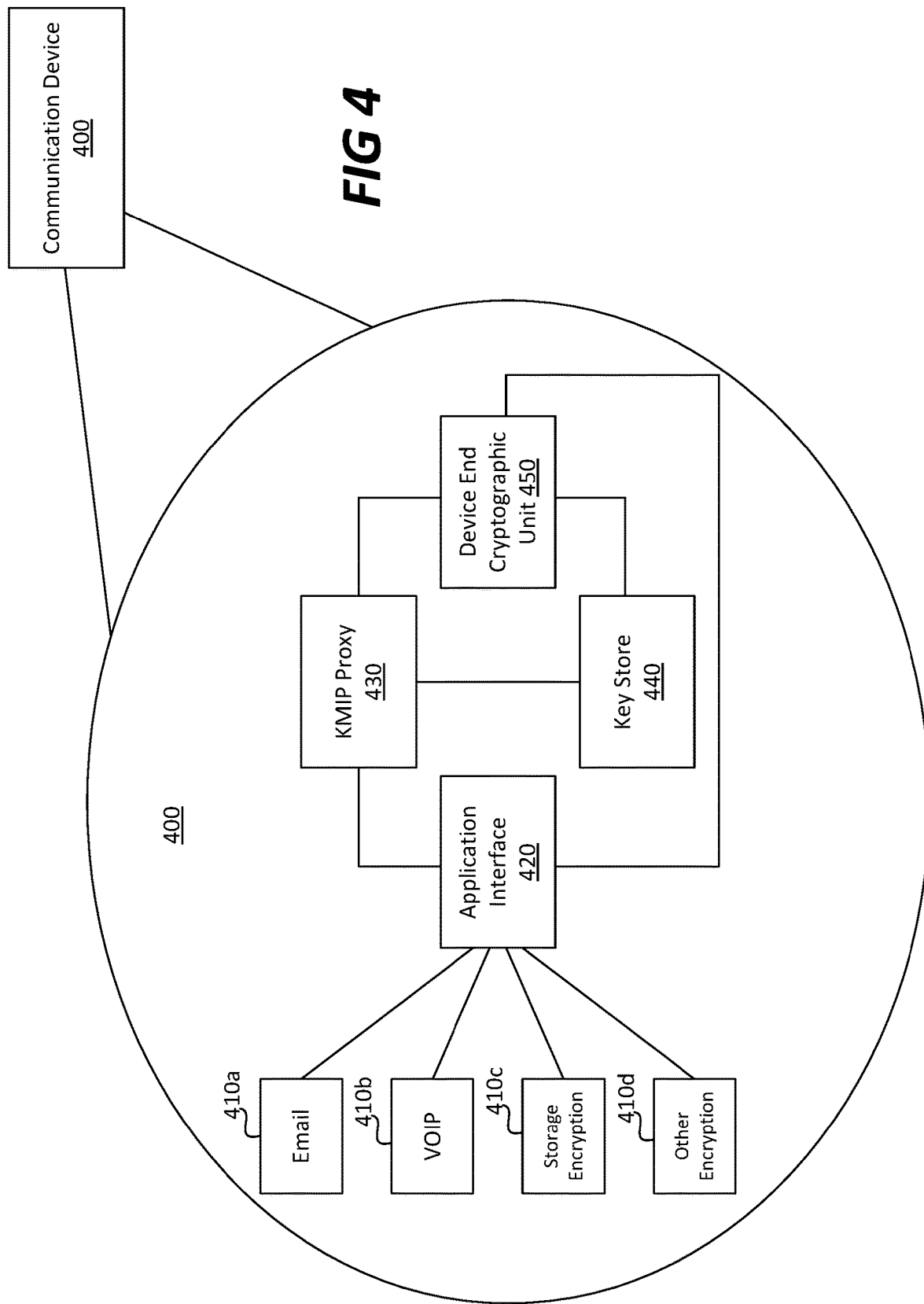
FIG. 4 is a schematic block diagram illustrating an example of a communication device consuming applied key management services according to some embodiments.

FIG. 4 illustrates an example of a communication device 400 consuming applied key management services as part of the enterprise according to some embodiments. Referring to FIGS. 1-4, the communication device 400 may be a device such as, but not limited to, the source device 150a, the target device 150b, the cellular device 250a, the network device 250b, . . . , the device N 250n, the device A 350a, the device B 350b, a combination thereof, and/or the like. In some embodiments, the communication device 400 leverages applied key management to receive encryption keys (or key updates) associated with applications such as, but not limited to, an Email application 410a, voice-over-internet protocol (VOIP) application 410b, storage encryption 410c, and/or other encryption applications 410d on the communication device 400.

The communication device 400 may be registered with an applied key management platform to receive applied key management services. The communication device 400 may provide an application interface 420 based configured to receive with encryption key distribution and encryption key management messages (e.g., the "allowed" message, the "denied" message, the hint, and/or the like) from the applied key management device 110. The application interface 420 may be coupled to each of the Email application 410a, voice-over-internet protocol (VOIP) application 410b, storage encryption 410c, and/or other encryption applications 410d to forward the accepted encryption key to them.

This communication device 400 may also utilize KMIP by a KMIP proxy 430 to receive KMIP type commands from the applied key management device 110. The KMIP proxy 430 may be connected to the key store 440 for managing the encryption keys stored therein. The KMIP proxy 430 may also be connected to a device-end cryptographic unit 450. The device-end cryptographic unit 450 may be configured to generate encryption keys. In response to the "denied" message, the device-end cryptographic unit 450 may generated a different encryption key to present to the policy engine for inspection. Whereas the hint is given, the device-end cryptographic unit 450 may generate a different encryption key based on the hint. The device-end cryptographic unit 450 may cache its encryption keys in the key store 440. The device-end cryptographic unit 450 may be coupled to the application interface 420. The application interface 420 may transmit the encryption keys generated along with the key attributes 160 to the policy engine and forward the response of the policy engine to the device-end cryptographic unit 450 e.g., when the response is negative.

Accordingly, operation-level policy inspection may be achieved. Given that the communication device 400 may be capable to interact with the policy engine regarding the encryption keys, the ability to service the request for an encryption key (or inspect the encryption key) by a third-party device (e.g., the policy engine residing in the applied key management device 110) acting as administrating may be achieved. The request 175 for an encryption key or the encryption key may be serviced each communication transaction.

Figure 5:
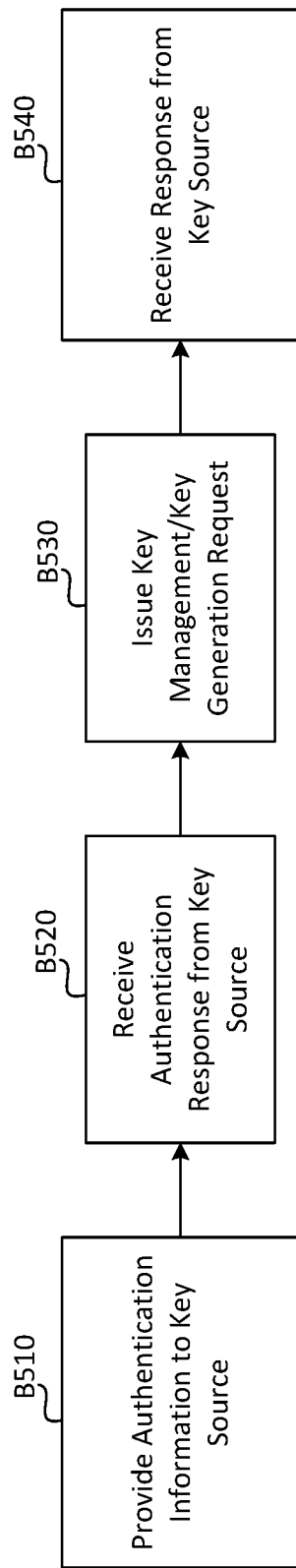
FIG. 5 is a process flow diagram illustrating an example of a request authentication process for issuing requests and receiving encryption keys according to some embodiments.

FIG. 5 illustrates an example of a request authentication process 500 for issuing requests 175 for encryption keys in various applied key management systems according to some embodiments. The request authentication process 500 may be internal to the applied key management device 110, when the applied key management device 110 (e.g., the management request handler 205, the applied key management device A 310a, the applied key management device B 310b, and/or the like) itself generates the encryption keys. In other embodiments, the request authentication process 500 may be external to the applied key management device 110 to support integration with existing key management and key generation infrastructure (e.g., the key generation and management device 230, the key management server A 330a, the key management server B 330b, and/or the like).

First, at block B510, the applied key management device 110 may provide authentication information to a key source 170. As described, such key source 170 may be the applied key management device 110 itself, the key generation and management device 230, the management user interface 220, the key federation interface 260, the communication devices (e.g., the cellular device 250a, network device 250b, . . . , device N 250n, source device 150a, target device 150b, device A 350a, device B 350b, communication device 400, a combination thereof, and/or the like), and/or other external key sources. The authentication information may be any suitable authentication method, such as username/passcode request, security handshake algorithms, biometric request, a combination thereof, and/or the like.

Next, at block B520, the applied key management device 110 may receive authentication response from the key source 170. The applied key management device 110 may authenticate the response and establish trusted relationship between the key source 170 and the applied key management device 110. Next at block B530, the applied key management device 110, the management user interface 220, the key generation and management device 230, the communication devices, and other API calls may issue a key management/generation request (e.g., the request 175) to the key source 170. In some embodiments, the applied key management device 110 may forward the request 175 from a trusted third party (e.g., the communication devices, the management user interface 220, the key federation interface 260, and/or other third-party devices) to the key source 170. In some embodiments, the request 175 may be directly sent to the key source 170. The applied key management device 110 may be configured to determine whether to generate encryption keys itself or forward the request to another key source 170 when the request 175 does not identify the key source 170. Next, at block B540, the applied key management device 110 may receive response (e.g., the encryption keys as requested) from the key source 170.

Subsequently, the encryption keys obtained by the applied key management device 110 may be evaluated based on the key attributes 160 and the policies 115 in the manner described. When allowed, the encryption keys may be distributed to the communication devices associated with the corresponding communication transaction. When denied, the applied key management device 110 may transmit the "denied" message (and in some instances, the hint) and standby for new encryption keys.

In some embodiments, multiple requests may be sent to a plurality of key sources 170, each request may correspond to a single communication transaction. In response, the multiple responses (e.g., encryption keys) may be received from the key sources 170. In other embodiments, multiple requests may be sent to a plurality of key sources 170, where two or more requests may correspond to a same communication transaction. As the applied key management device 110 may receive two or more encryption keys from the key sources 170. The applied key management device 110 may determine one of the two or more encryption keys for the communication transaction based on the policies 115 (e.g., the most secure out of the two or more encryption keys).

Accordingly, large scale distribution by the applied key management device 110 may be possible in systems including at least one source for the encryption keys and multiple recipient communication devices.

Figure 6:
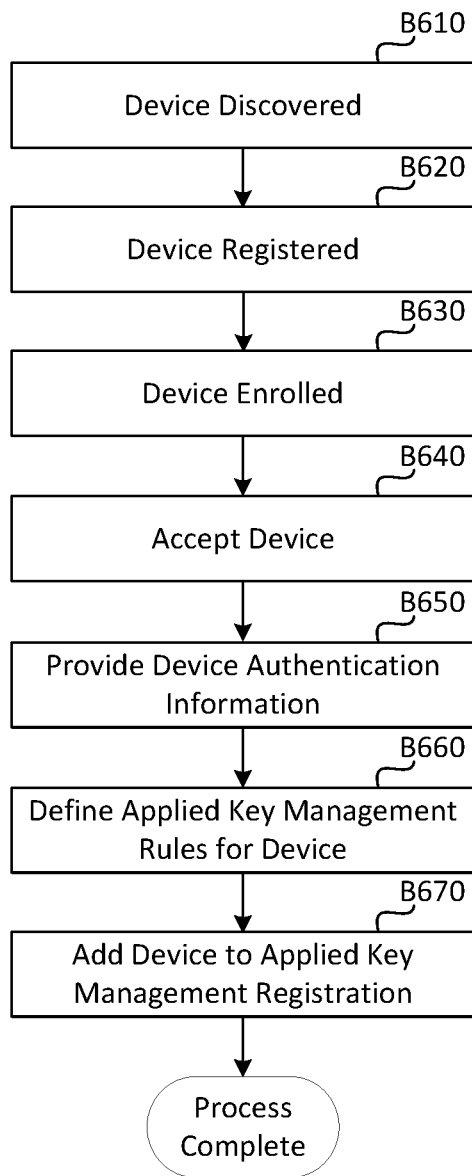
FIG. 6 is a process flow diagram illustrating an example of a communication device registration process implemented in various applied key management systems according to various embodiments.

FIG. 6 is a process flow diagram illustrating an example of a communication device registration process 600 implemented in various applied key management systems according to various embodiments. Blocks B610, B620, B630 may be executed simultaneously or sequentially in that order. First, at block B610 the communication device may be discovered (e.g., by the request handler 210). The request handler 210 may detect that the communication device is present within the enterprise (e.g., the networks associated with the enterprise) automatically.

At block B620, the communication device may be registered (e.g., by the request handler 210). In some embodiments, configuration information related to the applied key management systems may be transmitted to the communication device. Device information of the communication device may be transmitted to the local user repository 285, device inventory database 295, and/or the like. At block B630, the communication device may be enrolled (e.g., by the request handler 210). For example, the communication device may transmit a server authentication request the request handler 210 and receiving a positive authorization response.

Next, at block B640, the communication device may be accepted (e.g., by the request handler 210). For example, the request handler 210 and/or the management request handler 205 may check existing policies 115 based on the device information to determine whether the communication device has been classified in the appropriate group, whether the applied key management device 110 may be capable of managing the communication device, a combination thereof, and/or the like.

Next, at block B650, the request handler 210 may provide device authentication information to the communication device. The authentication information may include configurations (e.g., credentials, passcodes, and/or the like) to access the applied key management device 110. Next, at block B660, the request handler 210 and/or the management request handler 205 may define applied key management rules for the communication device. Following block B660 at block B670 a corresponding identifier, the commination device has been added to an applied key management registration. Subsequently, the communication device may request for encryption keys, generate encryption keys, receive approved encryption keys, and/or the like in the manner described. Such process ensures that the communication device utilizing services provided by the applied key management device 110 may meet the operable standards of the applied key management device 110.

Figure 7:
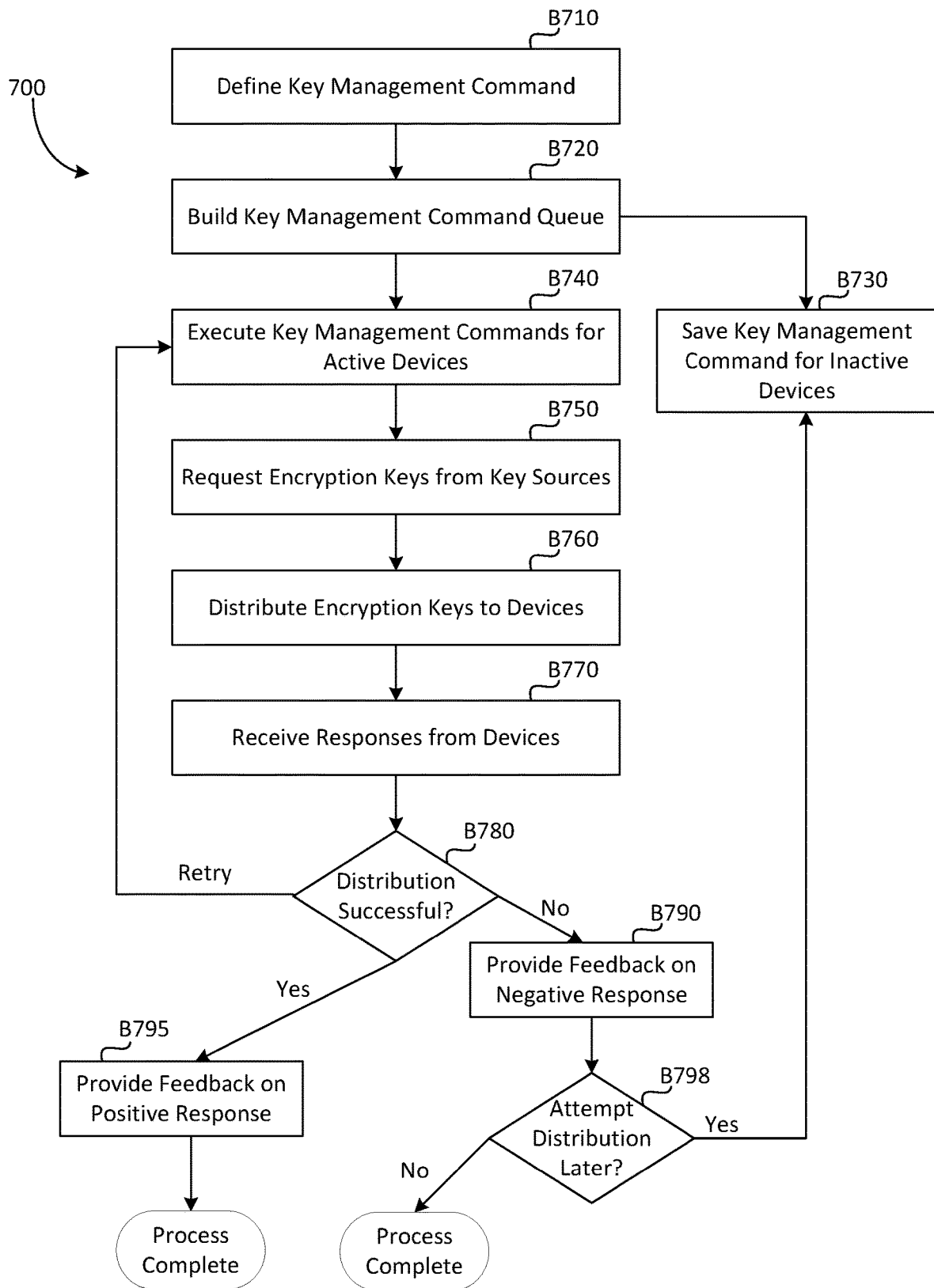
FIG. 7 is a process flow diagram illustrating an example of a key management and distribution process according to various embodiments.

FIG. 7 illustrates an example of a key management and distribution process 700 according to various embodiments. Referring to FIGS. 1-7, the key management and distribution process 700 may be implemented with communication devices registered, discovered, and/or enrolled with the applied key management device 110.

First, at block B710, the management request handler 205 may define key management command. A key management command may be a particularized command for a key management event (e.g., "job"). The key management event may be an event triggering a set of algorithms to create encryption keys based on the policies 115 and distribute (e.g., push) the encryption keys to at least one of the communication devices (e.g., the cellular device 250*a*, network device 250*b*, . . . , device N 250*n*, source device 150*a*, target device 150*b*, device A 350*a*, device B 350*b*, communication device 400, a combination thereof, and/or the like).

In some embodiments, the key management event may be based on time. For example, the management request handler 205 may be configured to rekey for at least some (sometimes all) of the communication devices associated with the enterprise (or another enterprise) periodically (e.g., every day, every week, every month, and/or the like). In various embodiments, the key management event may occur automatically through an API call. The API call may be issued from any components internal and/or external to the applied key management device 110 within a same or disparate enterprise.

The key management event may also be user-defined. For example, the management user interface 220 may receive user input from the designated user to generate encryption keys immediately for at least one communication device. In such examples, such user-defined key management events may be initiated in response to a sudden event, including cyber-attacks, security breaches, change to the polices 115, and/or the like. The management user interface 220 may also alter the policies 115 stored within the policy database 280 in response to these key management events. The new encryption keys created must follow the altered set of policies 115.

The key management command may include providing encryption key to some or all communication devices within the same or a disparate enterprise, re-transmitting a same or different encryption key to some or all communication devices within the same or disparate enterprise, a combination thereof, and/or the like. In various embodiments, the management request handler 205 may define for a plurality of key management commands, each of which may correspond to a communication transaction and/or communication device associated with the enterprise. In further embodiments, the management request handler 205 may define key management commands for communication devices associated with a disparate enterprise when allowed by the federation model. The management commands (e.g., encryption keys) may be transmitted via the key federation interfaces 260 associated with each enterprise.

Next, at block B720, the management request handler 205 may build a key management command queue. A job created in response to the key management event may include a plurality of key management commands, each of which may correspond to a communication device and/or a communication transaction. Accordingly, where the key management commands are generating new encryption keys and distributing to two or more communication devices, the key management commands may be queued (e.g., stored within the transactions database 275) for execution, given the volume of the key management commands. As such, a composite command may correspond to key management commands for multiple key sources to issue encryption keys to multiple encryption key receiving communication devices. The composite command may be associated with a plurality of key management commands, and may be stored as a whole in the transaction database 275 awaiting distribution. Thus, even if a server (e.g., the management request handler 205) is shut off before all the key management commands are executed/distributed, the process may resume as soon as the sever is switched on.

Key management command associated with inactive communication devices (e.g., communication devices that may be turned off and/or off the network) may be stored in the transactions database 275 for future distribution (e.g., when the inactive communication devices are switched on) by the management request handler 205 at block B730. On the other hand, for active devices (e.g., communication devices that may be turned on and/or on the network), the key management command may be executed by the management request handler 205 at block B740.

For example, the management request handler 205 may request encryption keys from key sources 170 based on the key management commands at block B750. For example, the key management commands may specify one or more key sources 170 to issue encryption keys to the communication devices. Accordingly, some communication devices may receive encryption keys from a first key source while other communication devise may receive encryption keys from a second different key source. Next, at block B760, the management request handler 205 may distribute encryption keys to the communication devices. In some embodiments, the management request handler 205 may perform encryption key inspection based on the key attributes 160 and the set of policies 115 in the manner described. Once approved, the management request handler 205 may forward the encryption keys to the corresponding communication devices through the request handler 210.

Next, at block B770, the management request handler 205 may receive response to the distribution from the communication devices. For example, the management request handler 205 may determine, based on the responses of the communication devices, whether such distribution was successful at block B780. Whereas the management request handler 205 determines that the distribution was successful with respect to a given communication device (e.g., that communication device has received the encryption key distributed to it), positive feedback may be provided to the management request handler 205 at block B795.

On the other hand, whereas the management request handler 205 determines that the distribution was unsuccessful (e.g., that communication device has not received the encryption key distributed to it) for a given communication device, a negative response of that communication device may be provided to the management request handler 205 at block B790. The management request handler 205 may then determine whether to attempt to execute the key management command again at a later time for that communication device based on preexisting algorithms or user input at block B798.

When management request handler 205 determines that execution of the key management commands (e.g., the distribution of the encryption) is not to be attempted again (B798: NO), the process ends. On the other hand, whereas the management request handler 205 determines that key management commands not successfully distributed are to be attempted again (B798: YES), the key management commands may be stored at block B730 (e.g., in the transactions database 275) for future distribution.

In some embodiments, when distribution of the key management commands may be unsuccessful, the management request handler 205 may determine to retry distribution of the unsuccessful key management commands (B780: RETRY). For example, the management request handler 205 may again execute key management commands for active devices at block B740.

Figure 8:
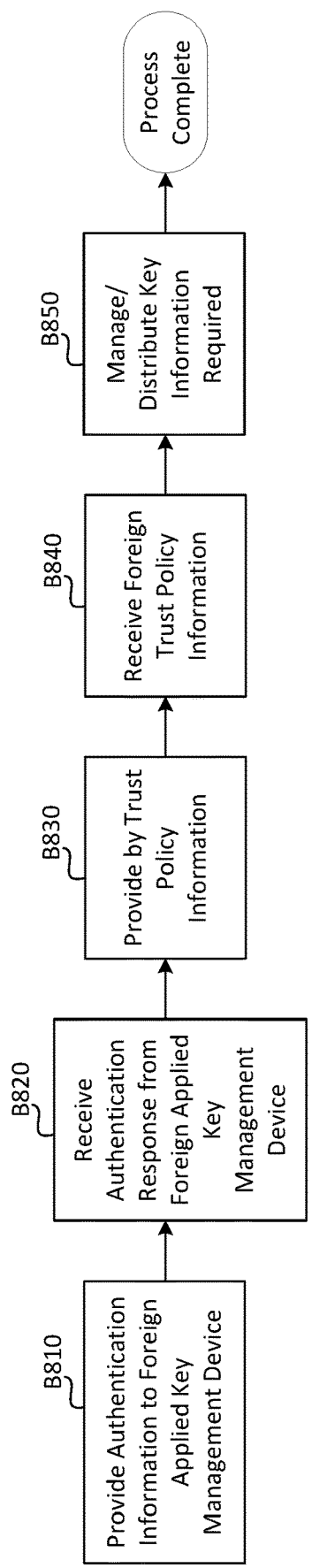
FIG. 8 is a process flow diagram illustrating an example of a key federation process according to various embodiments.

FIG. 8 is a process flow diagram illustrating an example of an encryption key federation process 800 according to various embodiments. Referring to FIGS. 1-8, applied key management devices 110 (e.g., both in a same local enterprise and in a foreign enterprise) may mutually authenticate and distribute encryption keys based on the policies 115 implemented for applied key management devices 110 or each enterprise for federating encryption keys from one enterprise to another enterprise. In addition, the encryption key federation process 800 may also include the receiving of encryption keys from a foreign applied key management device as a result of the federation policy of the foreign applied key management device.

First, at block B810, the local applied key management device (e.g., the applied key management device A 310a) may provide authentication information to a foreign applied key management device (e.g., the applied key management device B 310b). The authentication information may be any suitable authentication prompt and/or request for federation. Next, at block B820, the local applied key management device may receive authentication response from the foreign applied key management device agreeing to initiation the federation model. The blocks B810 and B820 may represent typical security credential handshakes, where federation trust has been established between the two enterprises.

Next, at block B830, the local applied key management device may provide trust policy information to the foreign applied key management device. At block B840, the local applied key management device may receive trust policy information from the foreign applied key management device. The trust policy information may include any configurations, settings, extent of trust, mutually agreed policies, a combination thereof, and/or the like.

Next, at block B850, the local applied key management device and the foreign applied key management device may manage and distribute key information (e.g., the encryption key, the associated key attributes 160, a combination thereof, and/or the like) in the manner described.

In particular embodiments, the foreign applied key management device transmit the request 175 to the local applied key management device for generating the encryption key for a communication transaction between a communication device associated with the foreign applied key management device and a communication device associated with the local applied key management device. The encryption key may be generated by the local applied key management device and inspected by local policy engine. The encryption key may be transmitted to the foreign applied key management device for inspection by the foreign policy engine in some embodiments, but not others.

In some embodiments, instead of the request 175, the foreign applied key management device may transmit a generated encryption key (which may or may not have been inspected by policy engine of the foreign applied key management device depending on trust policy information specified). The local applied key management device may or may not inspect the encryption key and its associated key attributes 160 by policies 115 based on the trust policy information specified between the enterprises.

Figure 9:
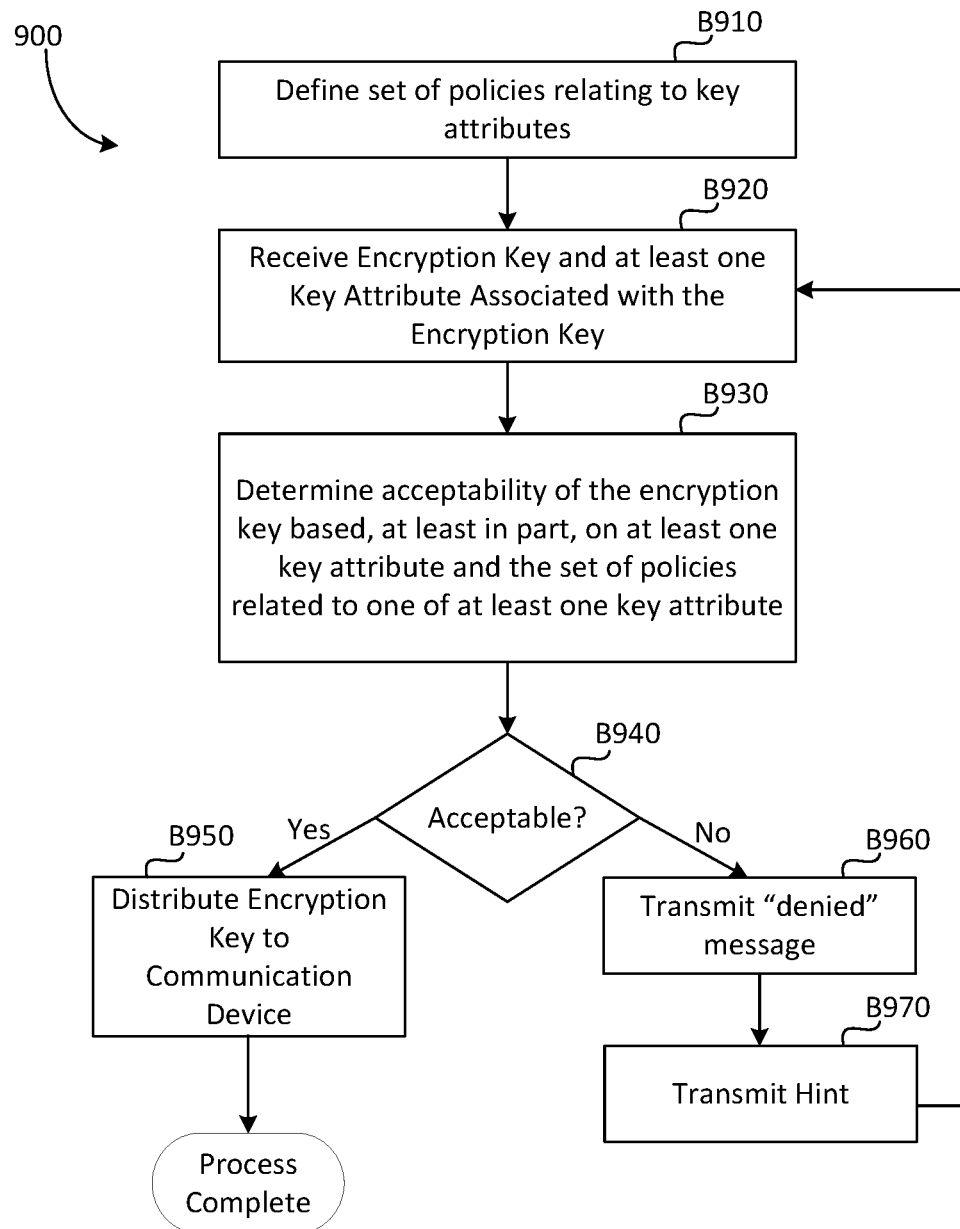
FIG. 9 is a process flow diagram illustrating an example of an encryption key management and distribution process according to various embodiments.

FIG. 9 is a process flow diagram illustrating an example of an encryption key management and distribution process 900 according to various embodiments. In various embodiments, the encryption key management and distribution process 900 may incorporate elements of applied key management, including key management, key distribution, and key federation.

First, at block B910, a set of policies 115 may be defined, where each policy 115 may relate to one or more key attributes 160. The policies 115 may be defined by designed personnel and stored in the policy database 280 for future retrieval and update. Next, at block B920, the management request handler 205 may receive encryption key and at least one key attribute associated with the encryption key from the key source 170 in the manner described.

Next, at block B930, the management request handler 205 may determine acceptability of the encryption key received based, at least in part, on the at least one key attribute and the set of policies 115 that relate to one of the at least one key attribute. For example, the management request handler 205 may check a value corresponding to a key attribute 160 to determine whether the value is within an acceptable range as defined by the policies 115 in the manner described.

Next, at block B940, the management request handler 205 may determine whether the encryption key is acceptable. Whereas the encryption key is acceptable (B940: YES), the management request handler 205 may distribute the encryption key to the communication devices requiring the key for the communication transaction therebetween, at block B950. On the other hand, whereas the encryption key is unacceptable (B940: NO), the management request handler 205 may transmit the "denied" message to the key source 170 at block B960. Optionally, the management request handler 205 may transmit the hint to the key source to facilitate key generation at block B970. The management request handler 205 may then standby until receiving a second encryption key (and associated key attributes 160) at block B920.

The applied key management system (e.g., the applied key management device 110, the management request handler 205, applied key management device A 310a, applied key management device B 310b, and/or the like) described herein may be implemented on any suitable computing devices having a processor and a memory device. The processor may include any suitable data processing device, such as a general-purpose processor (e.g., a microprocessor), but in the alternative, the processor may be any conventional processor, controller, microcontroller, or state machine. The processor may also be implemented as a combination of computing devices, e.g., a combination of a DSP and a microprocessor, a plurality of microprocessors, at least one microprocessor in conjunction with a DSP core, or any other such configuration. The memory may be operatively coupled to the processor and may include any suitable device for storing software and data for controlling and use by the processor to perform operations and functions described herein, including, but not limited to, random access memory RAM, read only memory ROM, floppy disks, hard disks, dongles or other RSB connected memory devices, or the like.

The applied key management device 110, the management request handler 205, applied key management device A 310a, and/or applied key management device B 310b may be implemented on suitable operating systems (OS) such as, but not limited to, the Linux OS, Windows, the Mac OS, and the like. Additionally, the applied key management device 110, the management request handler 205, applied key management device A 310a, and/or applied key management device B 310b may be implemented on small form factors such as embedded systems.

The embodiments described herein relate to encryptions keys. It should be appreciated by one of ordinary skills in the art that, in other embodiments, the systems and methods directed to the applied key management device 110 involving management, distribution, and federation may be likewise implemented for other sensitive objects such as, but not limited to, user identity information, certificates, biometric data, random number generator data, determinate random number generator data, non-determinate random number generator data, user authentication information, policy components, other components associated with organization security component, and/or the like.

Some embodiments described herein relate to an automated mechanism for key escrow operations in relation to applications, servers, and/or infrastructure local to a client (e.g., a communication device). An interface (e.g., an applied key management client interface) may be provided to the client for interfacing with an applied key management system. The applied key management system may represent a unified platform providing encryption key management, federation, and/or distribution in the manner described. The applied key management system may represent a centralized server for key escrow services.

Key escrow services may refer to operations of collecting local keys from a client and registering and/or storing the local keys at a third party location (e.g., in a secure key storage). The client may request the collected local key in the event that the collected local key may no longer be available to the client. The key escrow services may be performed by the applied key management system. In some embodiments, the applied key management system may facilitate key escrow services between the communication device and a third-party secure key storage external to the applied key management system. That is, the applied key management system may act as an interface between the communication device and the third-party secure key storage. In other embodiments, the secure key storage may be local to the applied key management system. In some embodiments, the secure key storage may be one or more of a Hardware Security Module (HSM), key management server, secure data storage, or the like.

As referred to herein, a "local key" may be an encryption key that is locally generated or locally stored. A locally-generated encryption key may be an encryption key installed or created as a part of licensing for an application of the client. A locally-stored encryption key may include any encryption key stored on the client (e.g., in a local key store of the client) that can be used for one or more applications on the client. The local key may be generated or stored on the client as an authoritative source of encryption key information for communication applications, storage applications, as well as other types of applications of the client. In some embodiments, a local key (or information of a local key) may include, but not limited to, key file for secure data storage on the client, key data for Secure Shell (SSH) on the client, license key for an application on the client, and/or the like.

The applied key management client interface may be tasked with reading the local key store and selecting a local key to be stored in and/or registered with the secure key storage. The applied key management client interface may send the request to register and/or store the local key to the applied key management system. The applied key management system may evaluate the request against at least one (e.g., first policy) of the policies 115 to determine whether the request is authorized. In response to determining that the request is authorized, the applied key management system may register and/or store the local key in or with the secure key storage.

In some embodiments, the applied key management client interface provided to the client may be a Microsoft Windows Service, Linux Daemon, or other suitable interfaces for providing a platform for local activities at the client and to provide an integration point with the applied key management system. In some embodiments, an application-specific plugin may be provided to query the local key store in the client for determining whether a local key should be registered and/or stored. In other embodiments, the plugin may not be provided to the communication device, and the applied key management client interface may determine whether a local key should be registered and/or stored. Thus, the applied key management client interface and/or the plugin can allow automated requests for local key escrow based on need.

Figure 10:
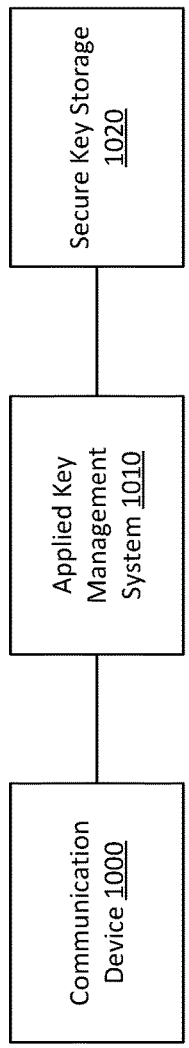
FIG. 10 is a schematic block diagram illustrating an example of relationship between a communication device, applied key management system, and secure key storage according to various embodiments.

FIG. 10 is a schematic block diagram illustrating an example of relationship between a communication device 1000, applied key management system 1010, and secure key storage 1020 according to various embodiments. Referring to FIGS. 1-10, the communication device 1000 may be the client. In some embodiments, the communication device 1000 may be a device such as, but not limited to, the source device 150a, the target device 150b, the cellular device 250a, the network device 250b, . . . , the device N 250n, the device A 350a, the device B 350b, a combination thereof, and/or the like. The applied key management system 1010 may be a server or system such as, but not limited to, the general applied key management system 100, applied key management system 200, and/or the like.

Figure 12:
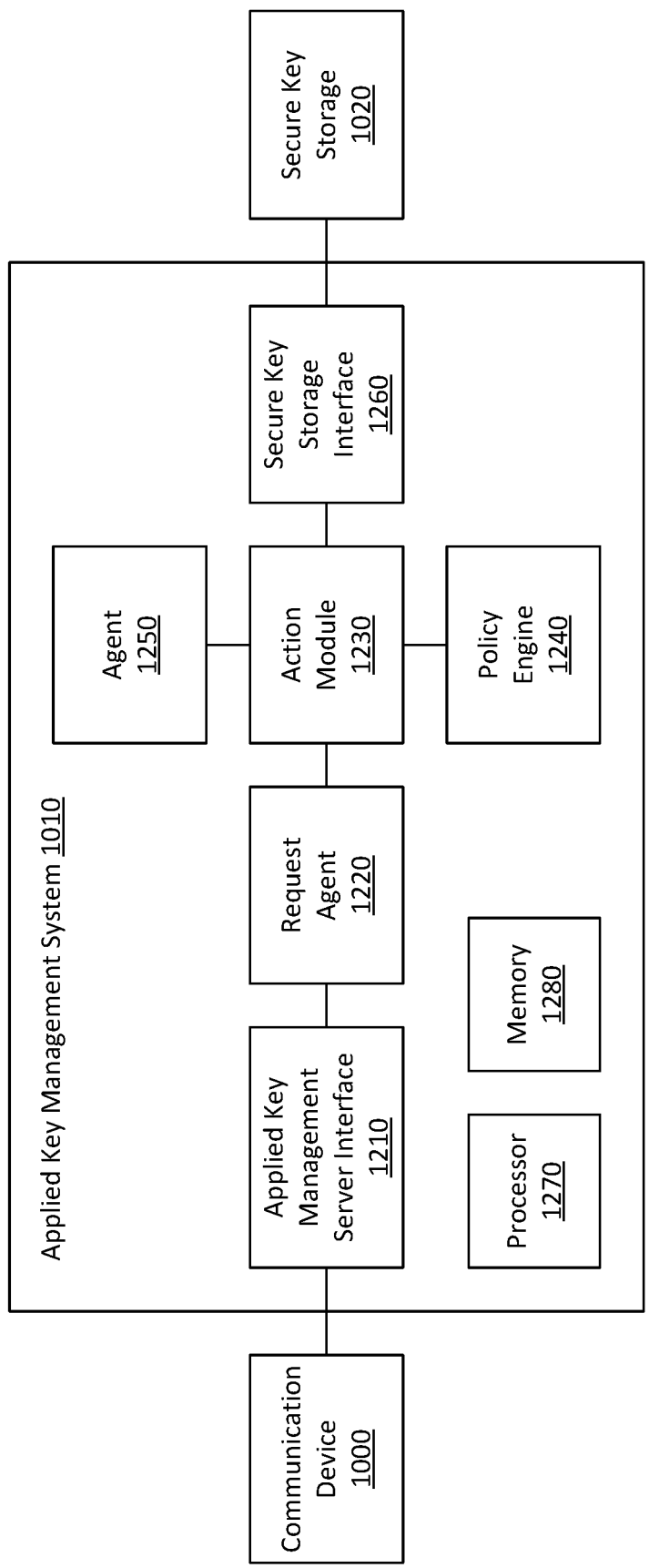
FIG. 12 is a schematic block diagram illustrating an example of an applied key management system according to some embodiments.

In some embodiments, the secure key storage 1020 may be any storage device that the applied key management system 1010 may be in communication with for registering/storing local keys originating from the communication device 1000. For example, the secure key storage 1020 may include any suitable storage devices including, but not limited to, a HSM, key management server, secure data storage, or the like. The secure key storage 1020 may utilize Public-Key Cryptography Standard #11, KMIP, or other Certificate Authority services with which the applied key management system 1010 can interface and communicate via a secure key storage interface 1260 (FIG. 12). In some embodiments, the applied key management system 1010 and the secure key storage 1020 may be connected via a network (e.g., the applied key management system 1010 and the secure key storage 1020 may reside in different network nodes). In other embodiments, the secure key storage 1020 may be local to the applied key management system 1010 (e.g., the applied key management system 1010 and the secure key storage 1020 may reside in a same network node).

In some embodiments, the communication device 1000 may determine whether a local key needs to be registered and/or stored and send a request to register and/or store the local key to the applied key management system 1010. The applied key management system 1010 may determine whether the request is authorized according to some (e.g., first policies) of the policies 115. In response to determining that the request is authorized, the applied key management system 1010 may communicate with the secure key storage 1020 to register and/or store the local key.

The communication device 1000 may be connected to the applied key management system 1010 via any suitable first (wired or wireless) network link. The applied key management system 1010 may be connected to the secure key storage 1020 via any suitable second (wired or wireless) network link. The network links may be secured or unsecured. For example, the network links may each be a wide area communication network, such as, but not limited to, the internet, or one or more intranets, LANs, ethernet networks, MANs, a WAN, combinations thereof, or the like. In particular embodiments, the network links may represent one or more secure network links configured with suitable security features, such as, but not limited to firewalls, encryption, or other software or hardware configurations that inhibits access to network communications by unauthorized personnel or entities. In other embodiments, the applied key management system 1010 may be connected to the secure key storage 1020 locally.

Figure 11:
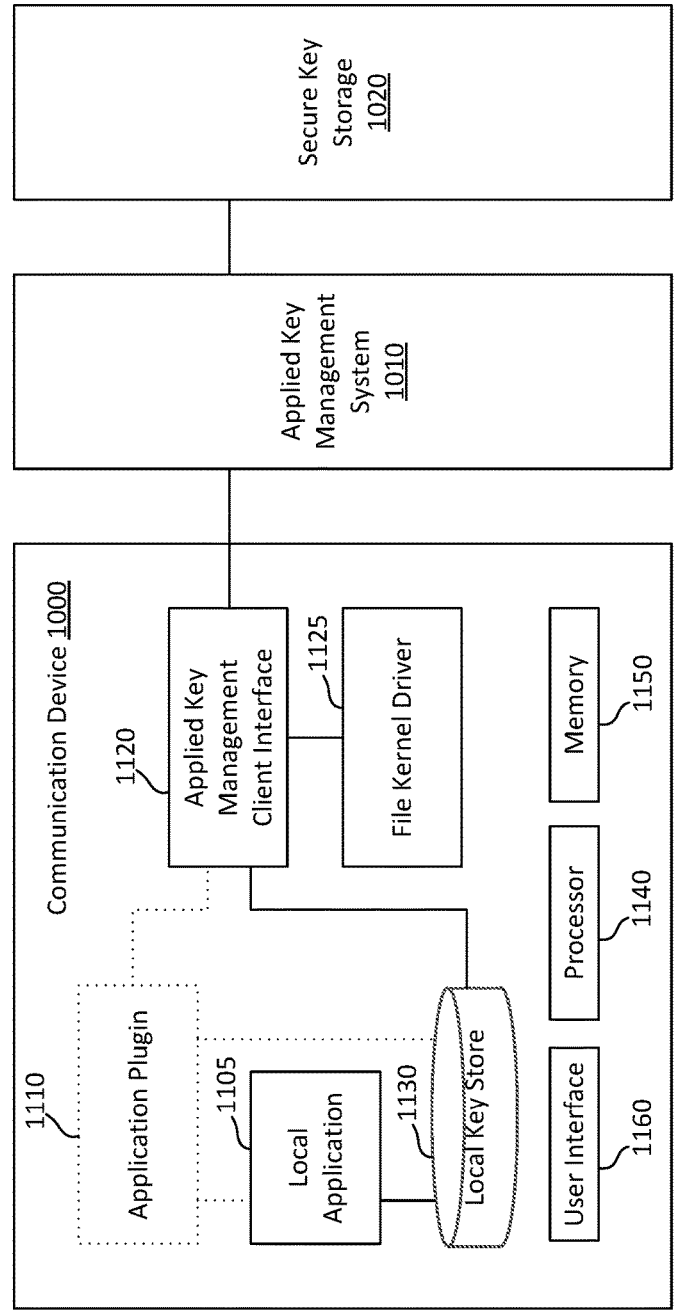
FIG. 11 is a schematic block diagram illustrating an example of the communication device according to some embodiments.

FIG. 11 is a schematic block diagram illustrating an example of the communication device 1000 of FIG. 10 according to some embodiments. Referring to FIGS. 1-11, the communication device 1000 may include a local application 1105, application plugin 1110, applied key management client interface 1120, file kernel driver 1125, and local key store 1130 in some embodiments. In some embodiments, the communication device 1000 may correspond to the communication device 400. For example, the local application 1105 may correspond to one or more of the email application 410a, VOIP application 410b, storage encryption 410c, and/or other encryption applications 410d. The local key store 1130 may correspond to the key store 440. The application plugin 1110 may correspond to the application interface 420. The applied key management client interface 1120 may correspond to support configurations and/or interfaces between the KMIP Proxy 430 and one or more of the application interface 420, key store 440, or device end cryptographic unit 450.

In some embodiments, the communication device 1000 may be a desktop computer, mainframe computer, server computer, laptop computer, pad device, smart phone device or the like, configured with hardware and software to perform operations described herein. For example, the communication device 1000 may include a typical desktop Personal Computer (PC) or Apple™ computer devices, having suitable processing capabilities, memory, user interface (e.g., display and input) capabilities, and communication capabilities, when configured with suitable application software (or other software) to perform operations described herein. Thus, particular embodiments may be implemented, using processor devices that are often already present in many business and organization environments, by configuring such devices with suitable software processes described herein. Accordingly, such embodiments may be implemented with minimal additional hardware costs. However, other embodiments of the communication device 1000 may include to dedicated device hardware specifically configured for performing operations described herein.

In some embodiments, the application plugin 1110 may access the local key store 1130 to determine whether a local key associated with the local application 1105 may need to be registered and/or stored. In response to determining that a local key need to be registered and/or stored, the application plugin 1110 may notify the applied key management client interface 1120 to initiate a request for registering and/or storing the local key. In other embodiments, the application plugin 1110 may not be provided, and the applied key management client interface 1120 may access the local key store 1130 to determine whether a local key associated with the local application 1105 may need to be registered and/or stored.

In some embodiments, the local key store 1130 may be a memory device (e.g., a cache, a database, and/or the like) used to store security objects such as local keys on the communication device 1000. In some embodiments, the local application 1105 may use the local keys stored in the local key store 1130. Illustrating with a non-limiting example, the local key store 1130 may be a Microsoft key store, Mozilla key store, and/or the like.

In some embodiments, the applied key management client interface 1120 may be a communication component (e.g., a service module or daemon) of the communication device 1000 for communicating with the applied key management system 1010. The applied key management client interface 1120 may be provided to the communication device 1000 as a software component for installation and/or update to enable interfacing with the applied key management system 1010, given that the communication device 1000 may not have capacity to support direct communication with the applied key management system 1010 natively.

The applied key management client interface 1120 may communicate with one or more of the application plugin 1110, local key store 1130, or the applied key management system 1010 (e.g., an applied key management server interface 1210 of FIG. 12) via Transmission Control Protocol (TCP), Transport Layer Security (TLS) protocol, Secure Socket Layer (SSL) protocol, or the like. In some embodiments, the applied key management client interface 1120 may communicate with one or more of the application plugin 1110, local key store 1130, or the applied key management system 1010 (e.g., an applied key management server interface 1210 shown in FIG. 12) via KMIP protocol or other suitable communication protocols.

In some embodiments, the applied key management client interface 1120 may support key management operations on the communication device 1000 such as, but not limited to, sending requests for registering and/or storing the local key to the applied key management system 1010. In some embodiments, the applied key management client interface 1120 may be connected to the local key store 1130 for reading local keys stored in the local key store 1130 and determining whether the local keys need to be registered and/or stored. The applied key management client interface 1120 may send the requests in response to determining that the local keys need to be registered and/or stored.

Alternatively, the applied key management client interface 1120 may receive the local keys that need to be registered and/or stored from the application plugin 1110. The applied key management client interface 1120 may send the requests in response to the application plugin 1110 determining that the local keys need to be registered and/or stored.

In some embodiments, the file kernel driver 1125 may be a driver and/or kernel for establishing connection with the applied key management system 1010. In other words, the file kernel driver 1125 may be a software module for providing configurations related to file access operations concerning security objects such as encryption keys (e.g., the local keys). In particular, the file kernel driver 1125 may configure the applied key management client interface 1120 to communicate with the applied key management system 1010 via KMIP-based or class X-based connections. The file kernel driver 1125 may configure the applied key management client interface 1120 to send the request to the applied key management system 1010 in some embodiments.

In some embodiments, the file kernel driver 1125 may configure the applied key management client interface 1120 to open connection with the applied key management system 1010, read or get a file from the applied key management system 1010, register/enroll the communication device 1000 with the applied key management system 1010 (in a manner such as, but not limited to, described with respect to the communication device registration process 600), close connection with the applied key management system 1010, and/or the like. Illustrating with a non-limiting example, the file kernel driver 1125 may be a Linux Kernel Driver, Windows File Driver, or the like. The file kernel driver 1125 may be connected to the applied key management client interface via an interface such as, but not limited to, Netlink.

One or more of the local application 1105, application plugin 1110, applied key management client interface 1120, or file kernel driver 1125 may be implemented by a processor 1140. The processor 1140 may include any suitable data processing device, such as a general-purpose processor (e.g., a microprocessor). In the alternative, the processor 1140 may be any conventional processor, controller, microcontroller, or state machine. The processor 1140 may also be implemented as a combination of computing devices, e.g., a combination of a Digital Signal Processor (DSP) and a microprocessor, a plurality of microprocessors, at least one microprocessor in conjunction with a DSP core, or any other such configuration. The processor 1140 may be configured with processor-readable instructions to perform features and functions of various components of the communication device 1000 as described herein.

A memory 1150 may be operatively coupled to the processor 1140 and may include any suitable non-transitory computer-readable device for storing software and data for controlling the processor 1140 to perform operations and functions described herein. The memory 1150 may include, but not limited to, a Random Access Memory (RAM), Read Only Memory (ROM), floppy disks, hard disks, dongles, or Recomp Sensory Board (RSB) connected memory devices, or the like. In some embodiments, the memory 1150 may be implemented with cloud storage. In some embodiments, local key store 1130 may be separate from the memory 1150. In other embodiments, the local key store 1130 may be a part of the memory 1150.

In some embodiments, the communication device 1000 may include a user interface 1160. The user interface 1160 may include at least one output device. The output device may include any suitable device that provides a human-perceptible visible signal, audible signal, tactile signal, or any combination thereof, including, but not limited to a touchscreen, Liquid Crystal Display (LCD), Light Emitting Diode (LED), Cathode Ray Tube (CRT), plasma, or other suitable display screen, audio speaker or other audio generating device, combinations thereof, or the like.

In some embodiments, the user interface 1160 may include at least one input device that provides an interface for operator (such as enterprise employees, technicians, or other authorized users) to access the communication device 1000. The input device may include any suitable device that receives input from a user including, but not limited to, one or more manual operator (such as, but not limited to a switch, button, touchscreen, knob, mouse, keyboard, keypad, slider or the like), microphone, or the like. In some embodiments, the input device may allow the operator to input information related to operating the local application.

FIG. 12 is a schematic block diagram illustrating an example of an applied key management system 1010 according to some embodiments. Referring to FIGS. 1-12, the applied key management system 1010 may include an applied key management server interface 1210, request agent 1220, action module 1230, policy engine 1240, agent 1250, and secure key storage interface 1260. In some embodiments, the applied key management system 1010 may correspond to the applied key management system 200 in some embodiments. For example, the applied key management server interface 1210 may correspond to the request handler 210. The request agent 1220, action module 1230, policy engine 1240, and agent 1250 may be implemented with the management request handler 205.

In some embodiments, the applied key management server interface 1210 may communicate with the communication device 1000 (e.g., the applied key management client interface 1120) via TCP, TLS protocol, SSL protocol, or the like. The applied key management server interface 1210 may receive communications (e.g., requests) from the communication device 1000. In some embodiments, the request corresponding to a local key may include one or more of the local key (e.g., the key attributes 160 of the local key), application identifier identifying an application (e.g., the local application 1105) associated with the local key, user identifier (e.g., a user account or credential) identifying a user authorized to use the local key, a device identifier identifying the communication device 1000, time at which the local key may be collected by the application plugin 1110 or the applied key management client interface 1120, or the like.

The applied key management server interface 1210 may additional receive a recovery request from the communication device 1000 for recovering (e.g., obtaining) a previously registered and/or stored local key. The applied key management system 1010 may request the previously registered and/or stored local key from the secure key storage 1020. The applied key management server interface 1210 may then send the previously registered and/or stored local key to the communication device 1000.

In some embodiments, the applied key management server interface 1210 may have capacity to communicate with multiple devices such as, but not limited to, the communication device 1000 for the activities described herein, enabling an "N-to-1" interface.

The applied key management server interface 1210 may send the received request for registering and/or storing a local key to the request agent 1220. In some embodiments, the request agent 1220 may receive the request for registering and/or storing a local key from the applied key management server interface 1210 and generate an action request (or job request) based on the request. In other words, the request agent 1220 may be an interface between the applied key management server interface 1210 and the action module 1230. The action request may correspond to the request of the communication device 1000 for registering and/or storing a local key. For example, the action request may include one or more of the local key (e.g., the key attributes 160 of the local key), application identifier identifying an application (e.g., the local application) associated with the local key, user identifier (e.g., a user account or credential) identifying a user authorized to use the local key, a device identifier identifying the communication device 1000, time at which the local key may be collected by the application plugin 1110 or the applied key management client interface 1120, or the like.

In some embodiments, an action module 1230 may receive the action request sent by the request agent 1220 and process the action request. For example, the action module 1230 may send information included in the action request to the policy engine 1240 for evaluation based on the policies 115 (e.g., the first policies). The first policies may include some of the policies 115 used to evaluate whether with the request to register and/or store the local key at the secure key storage 1020 can be authorized. In response to determining that registration and/or storage of the local key is authorized according to the first policies, the action module 1230 may send a request to the secure key storage 1020 through the secure key storage interface 1260. An agent 1250 may be coupled to the action module 1230 to provide configuration for the action module 1230. In some embodiments, the agent 1250 may perform some or all of the functions of the action module 1230 described herein.

In some embodiments, the action module 1230 may include a job management module, job module, and transaction module. The job management module may control creation, updating, executing, and deletion of the jobs or action requests. In some embodiments, the job management module may present the action request for inspection by the policy engine 1240 based on the first policies. In particular, the policy engine 1240 may determine whether the communication device 1000 identified by the device identifier is authorized to make any registration and/or storage request based on the relevant first policies stored in the policy database 280 or a cache memory. In response to determining that the communication device 1000 is authorized, the job management module may generate an action based on the action request and send the action to the job module.

In some embodiments, the job module may manage a composite set of actions (e.g., various queued actions) for various devices, including the communication device 1000. For each action in a queue maintained by the job module, the job module may create a transaction to connect to a given secure storage for registering and/or storing the local key. The job module may group two or more of the transactions into composite transactions. Illustrating with a non-limiting example, transactions to register and/or store the local keys to a same secure key storage may be grouped into a composite transaction. Illustrating with another non-limiting example, transactions to register and/or store local keys in a given time interval may be grouped into a composite transaction. Illustrating with yet another non-limiting example, transactions to register and/or store local keys for a same device (e.g., the communication device 1000) may be grouped into a composite transaction. In some embodiments, the job module may present the composite transactions and/or singular transactions to the policy engine 1240 for evaluation based on the first policies. In response to determining that a given transaction is authorized based on the first policies, the job module may send the transaction to the transaction module for execution.

The transaction module may receive the transaction from the job module and execute the transaction. For example, the transaction module may request the secure key storage 1020 via the secure key storage interface 1260 to register and/or store local keys requested by the communication device 1000. In response to determining that the transaction cannot be completed or in response to determining that the transaction fails, the transaction module may present the failure to the policy engine 1240 for evaluation based on the first policies. The first policies may indicate a post-failure transaction based on one or more of a type of failure, the identity of the communication device 1000, the identity of the particular secure key storage (e.g., the secure key storage 1020), or the like. Post-failure transaction may be, for example, retransmitting the request to the secure key storage 1020 periodically for the next 10 seconds if the failure is a communication failure (e.g., faulty network connection) to reach the secure key storage 1020 known to be currently active. In another example, the post-failure transaction may be sending the communication device 1000 a failure message if the secure key storage 1020 is currently offline or if the first policies do not authorize registering/storing the local key.

The secure key storage interface 1260 may be any suitable interface that can connect with the secure key storage 1020. The secure key storage interface 1260 may send requests to the secure key storage 1020 for obtaining a local key. The secure key storage interface 1260 may receive the requested local key from the secure key storage 1020. The secure key storage interface 1260 may receive a failure message from the secure key storage 1020 in the event that the secure key storage 1020 cannot issue the requested local key.

In response to receiving a failure message from the secure key storage 1020 indicating that the secure key storage 1020 cannot register/store the local key, the secure key storage interface 1260 may relay the failure message to the action module 1230. The action module 1230 may relay the failure message to the request agent 1220. The request agent 1220 may relay the failure message to the applied key management server interface 1210, which may send the failure message to the communication device 1000.

In response to receiving a recovery request from the communication device 1000, the secure key storage interface 1260 may request the previously-stored local key from the secure key storage 1020. Upon receiving the previously-stored local key, the secure key storage interface 1260 may relay the previously-stored local key to the action module 1230. The action module 1230 may relay the previously-stored local key to the request agent 1220. The request agent 1220 may relay the local key to the applied key management server interface 1210, which may send the local key to the communication device 1000.

One or more of the applied key management server interface 1210, request agent 1220, action module 1230, policy engine 1240, agent 1250, or secure key storage interface 1260 may be implemented by a processor 1270. The processor 1270 may include any suitable data processing device, such as a general-purpose processor (e.g., a microprocessor). In the alternative, the processor 1270 may be any conventional processor, controller, microcontroller, or state machine. The processor 1270 may also be implemented as a combination of computing devices, e.g., a combination of a DSP and a microprocessor, a plurality of microprocessors, at least one microprocessor in conjunction with a DSP core, or any other such configuration. The processor 1270 may be configured with processor-readable instructions to perform features and functions of various components of the applied key management system 1010 as described herein.

A memory 1280 may be operatively coupled to the processor 1270 and may include any suitable non-transitory computer-readable device for storing software and data for controlling the processor 1270 to perform operations and functions described herein. The memory 1280 may include, but not limited to, a RAM, ROM, floppy disks, hard disks, dongles, or RSB connected memory devices, or the like. In some embodiments, the memory 1280 may be implemented with cloud storage.

Figure 13:
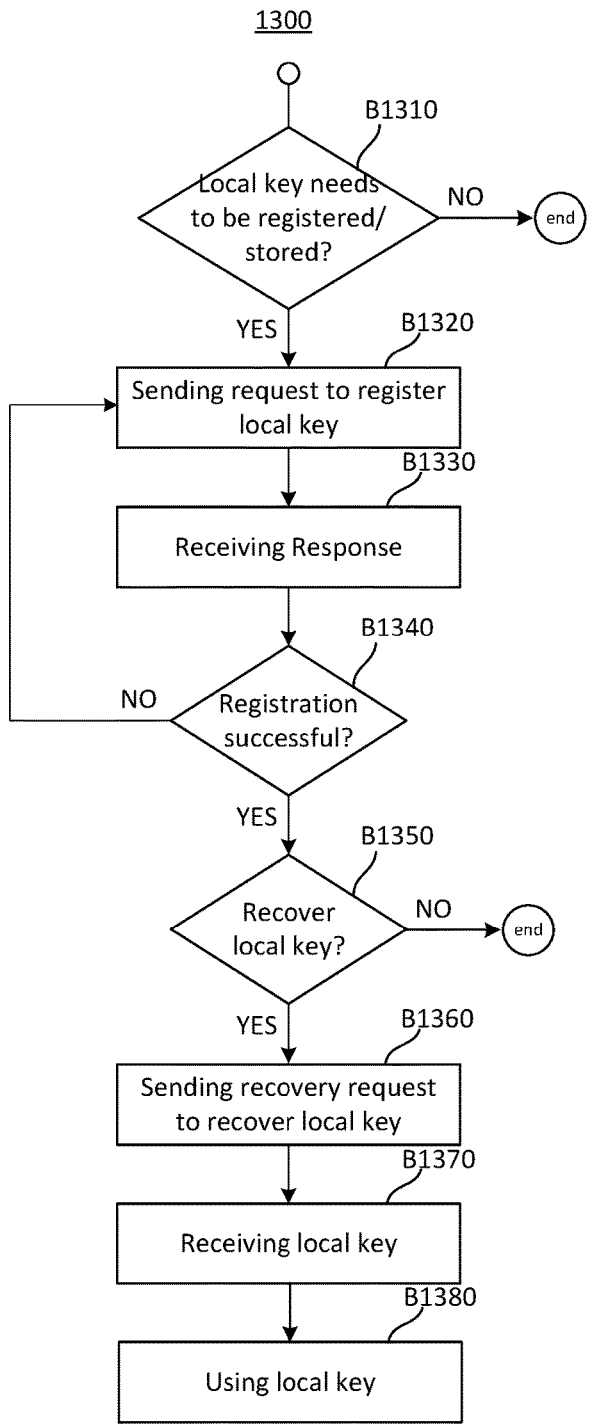
FIG. 13 is a process flow diagram illustrating an example of a local key registration method according to various embodiments.

FIG. 13 is a process flow diagram illustrating an example of a local key registration method 1300 according to various embodiments. Referring to FIGS. 1-13, the local key registration method 1300 may be performed by the processor 1140 of the communication device 1000 according to some embodiments.

At block B 1310, the processor 1140 (e.g., the applied key management client interface 1120) may determine whether a local key needs to be registered and/or stored. For example, the processor 1140 (e.g., the applied key management client interface 1120) may search the local key store 1130 for any local key that has not been registered and/or stored. In some embodiments, in response to a local key being registered and/or stored, a tag or another indicator associated with the local key may be changed to indicate that the local key has been registered and/or stored at the secure key storage 1020. Otherwise, the tag or indicator may indicate that the local key has not been registered and/or stored at the secure key storage 1020. The processor 1140 (e.g., the applied key management client interface 1120) may search the local key store 1130 for any local key having a tag or indicator indicating that the local key has not been registered and/or stored. In some embodiments, in response to a local key being generated or obtained, the applied key management client interface 1120 may determine that the newly generated or obtained local key needs to be registered and/or stored.

In other embodiments, instead of the applied key management client interface 1120, the application plugin 1110 (e.g., the processor 1140) may determine whether a local key needs to be registered and/or stored in a manner similar to described with respect to the applied key management client interface 1120. Once the application plugin 1110 determines that a local key needs to be registered and/or stored, the application plugin 1110 may send the local key to the applied key management client interfaced 1120 for requesting the applied key management system 1010.

In some embodiments, the processor 1140 (e.g., the application plugin 1110 or the applied key management client interface 1120) may determine whether a local key needs to be registered and/or stored (by searching the local key store 1130) periodically (e.g., every hour, day, week, or month). In some embodiments, the processor 1140 (e.g., the application plugin 1110 or the applied key management client interface 1120) may determine whether a local key needs to be registered and/or stored (by searching the local key store 1130) in response to that local key being generated, obtained, or stored. In some embodiments, the processor 1140 (e.g., the application plugin 1110 or the applied key management client interface 1120) may determine whether a local key needs to be registered and/or stored (by searching the local key store 1130) in response to receiving a command to search the local key store 1130 from the applied key management system 1010.

In response to determining that no local key needs to be registered and/or stored (B1310: NO), the method 1300 ends. On the other hand, in response to determining that a local key needs to be registered and/or stored (B1310: YES), the processor 1140 (e.g., the applied key management client interface 1120) may send a request for the registering and/or storing the local key to the applied key management system 1010, at block B1320. In some embodiments, the request may include one or more of the local key (e.g., the key attributes 160 of the local key), application identifier identifying an application (e.g., the local application 1105) associated with the local key, user identifier (e.g., a user account or credential) identifying a user authorized to use the local key on the communication device 1000, a device identifier identifying the communication device 1000, time at which the local key may be collected by the application plugin 1110 or the applied key management client interface 1120, or the like.

At block B 1330, the processor 1140 may receive a response from the applied key management system as to whether the registration and/or storage attempt is successful in some embodiments. At block B 1340, the processor 1140 (e.g., the applied key management client interface 1120) may determine whether the registration and/or storage is successful based on content of the response in some embodiments.

In response to determining that the local key has not been successfully registered and/or stored at the secure key storage 1020 (B1340: NO), the processor 1140 (e.g., the applied key management client interface 1120) may resend the request at block B 1320 in some embodiments. In some embodiments, the processor 1140 (e.g., the applied key management client interface 1120) may notify the user (e.g., the operator of the communication device 1000) of the failure. For instance, the processor 1140 (e.g., the applied key management client interface 1120) may configure the output device of the user interface 1160 to display a visual message, output an audio message, or otherwise generate any suitable audiovisual or tactile feedback to the operator notifying the operator of the failure.

On the other hand, if the local key has been successfully registered and/or stored at the secure key storage 1020 (B1340: YES), the processor 1140 (e.g., the applied key management client interface 1120) may recover the local key (e.g., the previously registered and/or stored local key). For example, at block B1350, the processor 1140 (e.g., the applied key management client interface 1120 or the application plugin 1110) may determine whether to recover the local key from the secure key storage 1020. Illustrating with a non-limiting example, the processor 1140 (e.g., the applied key management client interface 1120 or the application plugin 1110) may determine that recovery of the local key is needed in response to determining that the local key stored in the local key store 1130 may be corrupt, deleted, expired, or otherwise unavailable.

In response to determining that the local key previously registered and/or stored at the secure key storage 1020 need to be recovered (B1350: YES), the processor 1140 (e.g., the applied key management client interface 1120) may send a recovery request to the applied key management system 1010 to recover the local key at block B1360. At block B1370, the processor 1140 (e.g., the applied key management client interface 1120) may receive the recovered local key from the applied key management system 1010. In some embodiments, the processor 1140 (e.g., the applied key management client interface 1120) may add the recovered local key to the local key store 1130 and associate the recovered local key with the local application 1105. At block B1380, the processor 1140 (e.g., the local application 1105) may use the recovered local key for encryption.

On the other hand, in response to determining that the local key previously registered and/or stored at the secure key storage 1020 does not need to be recovered (B1350: NO), the method 1300 ends.

Figure 14:
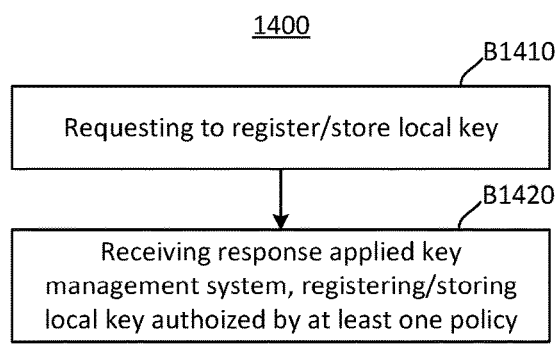
FIG. 14 is a process flow diagram illustrating an example of a local key registration method according to various embodiments.

FIG. 14 is a process flow diagram illustrating an example of a local key registration method 1400 according to various embodiments. Referring to FIGS. 1-14, each of blocks B1410-B1420 may correspond to one or more of blocks B1310-B1380. At block B1410, the processor 1140 may request the applied key management system 1010 to register and/or store a local key associated with an application (e.g., the local application 1105).

At block B1420, the processor 1140 may receive the response from the applied key management system 1010 as to whether registration and/or storage to the secure key storage 1020 are successful. The registration and/or storage of the local key may be authorized by the applied key management system 1010 according to at least one first policy.

Figure 15:
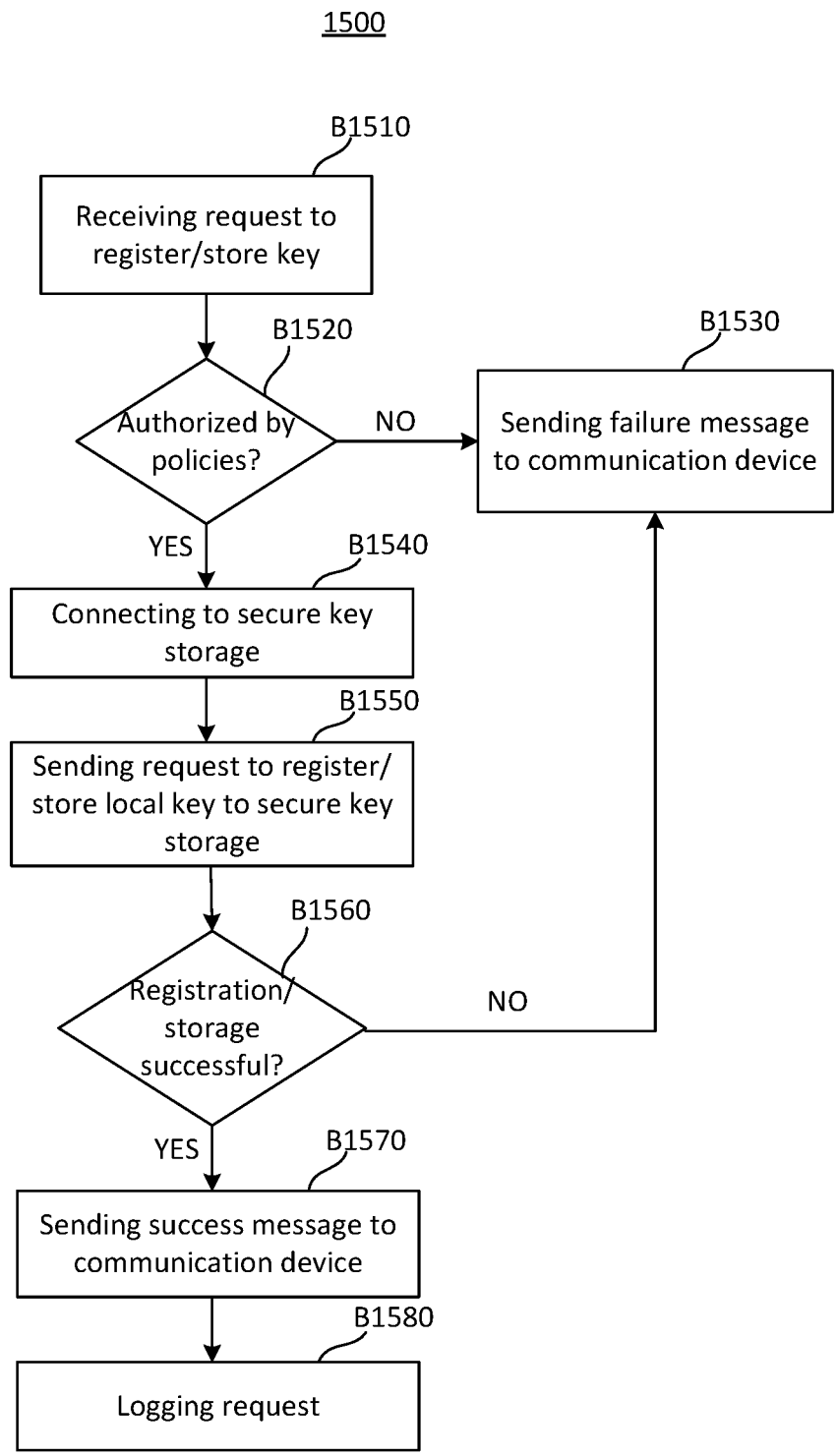
FIG. 15 is a process flow diagram illustrating an example of a local key registration method according to various embodiments.

FIG. 15 is a process flow diagram illustrating an example of a local key registration method 1500 according to various embodiments. Referring to FIGS. 1-15, the local key registration method 1500 may be performed by the processor 1270 of the applied key management system 1010 according to some embodiments. At block B1510, the processor 1270 (e.g., the applied key management server interface 1210) may receive the request to register and/or store the local key from the communication device 1000 (e.g., from the applied key management client interface 1120) in some embodiments. The request may include one or more of the local key (e.g., the key attributes 160 of the local key), application identifier identifying an application (e.g., the local application 1105) associated with the local key, user identifier (e.g., a user account or credential) identifying a user authorized to use the local key, a device identifier identifying the communication device 1000, time at which the local key may be collected by the application plugin 1110 or the applied key management client interface 1120, or the like.

At block B1520, the processor 1270 may determine whether the request is authorized by the first policies. For instance, the request agent 1220 may receive the request from the applied key management server interface 1210 and generate an action request based on the request. The action request may include one or more of the local key (e.g., the key attributes 160 of the local key), application identifier identifying an application (e.g., the local application 1105) associated with the local key, user identifier (e.g., a user account or credential) identifying a user authorized to use the local key, a device identifier identifying the communication device 1000, time at which the local key may be collected by the application plugin 1110 or the applied key management client interface 1120, or the like. The action module 1230 may present the action request to the policy engine 1240 for inspection by the first policies.

In some embodiments, the policy engine 1240 may determine whether the particular communication device 1000 may be authorized to request registration and/or storage of a local key based on the first policies. For instance, the communication device 1000 may be associated with a particular node within a hierarchical structure or a particular group/classification. Based on the identifier of the communication device 1000, the policy engine 1240 may determine the associated node and/or group of the communication device 1000. The policy engine 1240 may then determine whether the node (or parent node(s)) and/or group associated with the communication device 1000 may be associated with authorization to request registration and/or storage of a local key. Illustrating with a non-limiting example, at least one of the first policies may indicate that if the communication device 1000 is associated with node B or Group 2, then the action request corresponding to the communication device 1000 may be denied. Illustrating with another non-limiting example, at least one of the first policies may indicate that if the node (e.g., node B) associated with the communication device 1000 has a particular parent node (e.g., node A), then the action request corresponding to the communication device 1000 may be denied.

Illustrating with another non-limiting example, the policy engine 1240 may determine whether an action request for the particular application (identified by the application identifier identifying the local application 1105) may be authorized. At least one of the first policies may indicate that an action request for an application may not be authorized in some embodiments. For instance, one of the first policies may indicate that if the application associated with an action request is an email application, then the action request corresponding to the email application may be denied.

Illustrating with yet another non-limiting example, the policy engine 1240 may determine whether an action request for the particular user account (identified by the user identifier identifying the user of the local application 1105) may be authorized. At least one of the first policies may indicate that an action request for a given user may not be authorized in some embodiments. For instance, one of the first policies may indicate that if the user associated with an action request is "User_1," then the action request corresponding to the user may be denied.

Illustrating with yet another non-limiting example, the policy engine 1240 may determine whether an action request may be authorized based on one or more other suitable key attributes 160 such as, but not limited to, key size of the local key, classification of the local key, time at which the local key has been requested, preferred secure key storage, role associated with the communication device 1000, name of the local key, or the like.

In some embodiments, the key attributes 160 including, but not limited to, the key size of the local key, classification of the local key, time at which the local key has been requested, preferred secure key storage, role associated with the communication device 1000, name of the local key, and/or the like may be included as a part of the request received by the applied key management system 1010 (e.g., a block B1510). In some embodiments, such key attributes 160 may be determined by the processor 1270 (e.g., the request agent 1220, the action module 1230, agent 1250, or policy engine 1240) based on one or more of the application identifier, user identifier, device identifier, or the like. For example, the processor 1270 (e.g., the request agent 1220, the action module 1230, agent 1250, or policy engine 1240) may determine the key attributes 160 for the local key by checking a look-up table stored in the memory 1280.

In response to determining that the action request may not be authorized by the policies 115 (B1520: NO), the processor 1270 may be configured to send a failure message to the communication device 1000, at block B1530. For example, the policy engine 1240 may send a failure message to the action module 1230 in response to determining failure based on the first policies. The action module 1230 may forward the failure message to the request agent 1220. The request agent 1220 may forward the failure message to the applied key management server interface 1210. The applied key management server interface 1210 may send the failure message to the communication device 1000.

The communication device 1000, in response to receiving the failure message, may notify the user (e.g., the operator of the communication device 1000) of the local application 1105 of the failure. For instance, the processor 1140 (e.g., the application plugin 1110) may configure the output device of the user interface 1160 to display a visual message, output an audio message, or otherwise generate any suitable audiovisual or tactile feedback to the user notifying the user of the failure.

On the other hand, in response to determining that the action request may be authorized by the first policies (B1520: YES), the processor 1270 may be configured to connect to the secure key storage 1020, at block B1540. For example, the processor 1270 (e.g., the secure key storage interface 1260) may interface with the secure key storage 1020 via suitable standards to initiate communication with the secure key storage 1020. At block B1550, the processor 1270 (e.g., the secure key storage interface 1260) may send a request to register and/or store the local key corresponding to the action request to the secure key storage 1020. The secure key storage interface 1260 may act on behalf of the communication device 1000 to request registration and/or storage to the secure key storage 1020.

At block B1560, the processor 1270 (e.g., the secure key storage interface 1260) may determine whether the local key is successfully registered and/or stored at the secure key storage 1020. The secure key storage interface 1260 may receive a success message if the secure key storage 1020 can register and/or store the local key. The secure key storage interface 1260 may receive a failure message from the secure key storage 1020 if the secure key storage 1020 cannot register and/or store the local key.

In response to determining that the registration and/or storage attempt is unsuccessful (B1560: NO), the processor 1270 may send a failure message to the communication device 1000, at block B1530. For example, the secure key storage interface 1260 may send a failure message to the action module 1230 in response to receiving the failure message. The action module 1230 may forward the failure message to the request agent 1220. The request agent 1220 may forward the failure message to the applied key management server interface 1210. The applied key management server interface 1210 may send the failure message to the communication device 1000.

The communication device 1000, in response to receiving the failure message, may notify the user (e.g., the operator of the communication device 1000) of the failure. For instance, the processor 1140 (e.g., the application plugin 1110) may configure the output device of the user interface 1160 to display a visual message, output an audio message, or otherwise generate any suitable audiovisual or tactile feedback to the user notifying the user of the failure to register and/or store the local key.

On the other hand, in response to determining that the registration and/or storage attempt is successful (B1560: YES), the processor 1270 may send a success message to the communication device 1000, at block B 1570. For example, the secure key storage interface 1260 may send the success message to the action module 1230 in response to receiving the success message. The action module 1230 may forward the success message to the request agent 1220. The request agent 1220 may forward the success message to the applied key management server interface 1210. The applied key management server interface 1210 may send the success message to the communication device 1000.

At block B1580, the processor 1270 may log the request and store the action in the memory 1280. The action module 1230 may store information related to the action, including the application identifier, user identifier, device identifier, time at which the local key may be collected, time at which the request is sent to the secure key storage 1020, identifier (e.g., a Universal Unique Identifier (UUID) of the operation or action corresponding to the registration and/or storage, relevant policies 115 (e.g., the first policies) used for evaluating the registration and/or storage, and/or the like.

Figure 16:
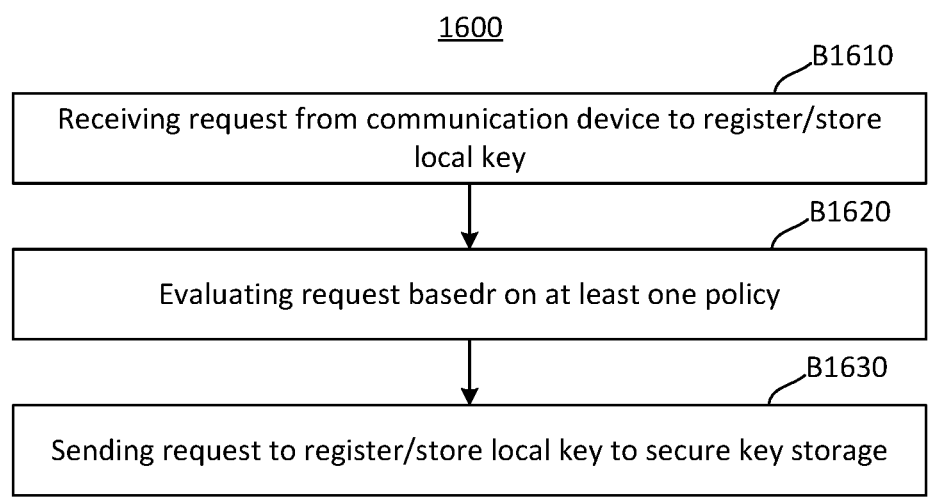
FIG. 16 is a process flow diagram illustrating an example of a local key registration method according to various embodiments.

FIG. 16 is a process flow diagram illustrating an example of a local key registration method 1600 according to various embodiments. Referring to FIGS. 1-16, each of blocks B1610-B1630 may correspond to one or more of blocks B1510-B1580. At block B1610, the processor 1270 may receive the request from the communication device 1000 to register and/or store the local key with the secure key storage 1020 for an application (e.g., the local application 1105) according to some embodiments.

At block B1620, the processor 1270 may evaluate the request based on the at least one first policy. For example, the processor 1270 may present one or more of the application identifier, user identifier, device identifier, time at which the local key may be collected, or other suitable key attributes 160 to be inspected by the at least one first policy. At block B1630, the processor 1270 may send the request to register and/or store the local key to the secure key storage 1020.

In other embodiments in which the secure key storage 1020 may be local to the applied key management system 1010, instead of sending the request to the secure key storage 1020 via a network (e.g., via the second network link), the processor 1270 may send the request locally to the secure key storage 1020, for example, at blocks B1540 and B1550. Additionally, the processor 1270 may receive success/failure messages from the secure key storage 1020 locally in such embodiments.

Figure 17:
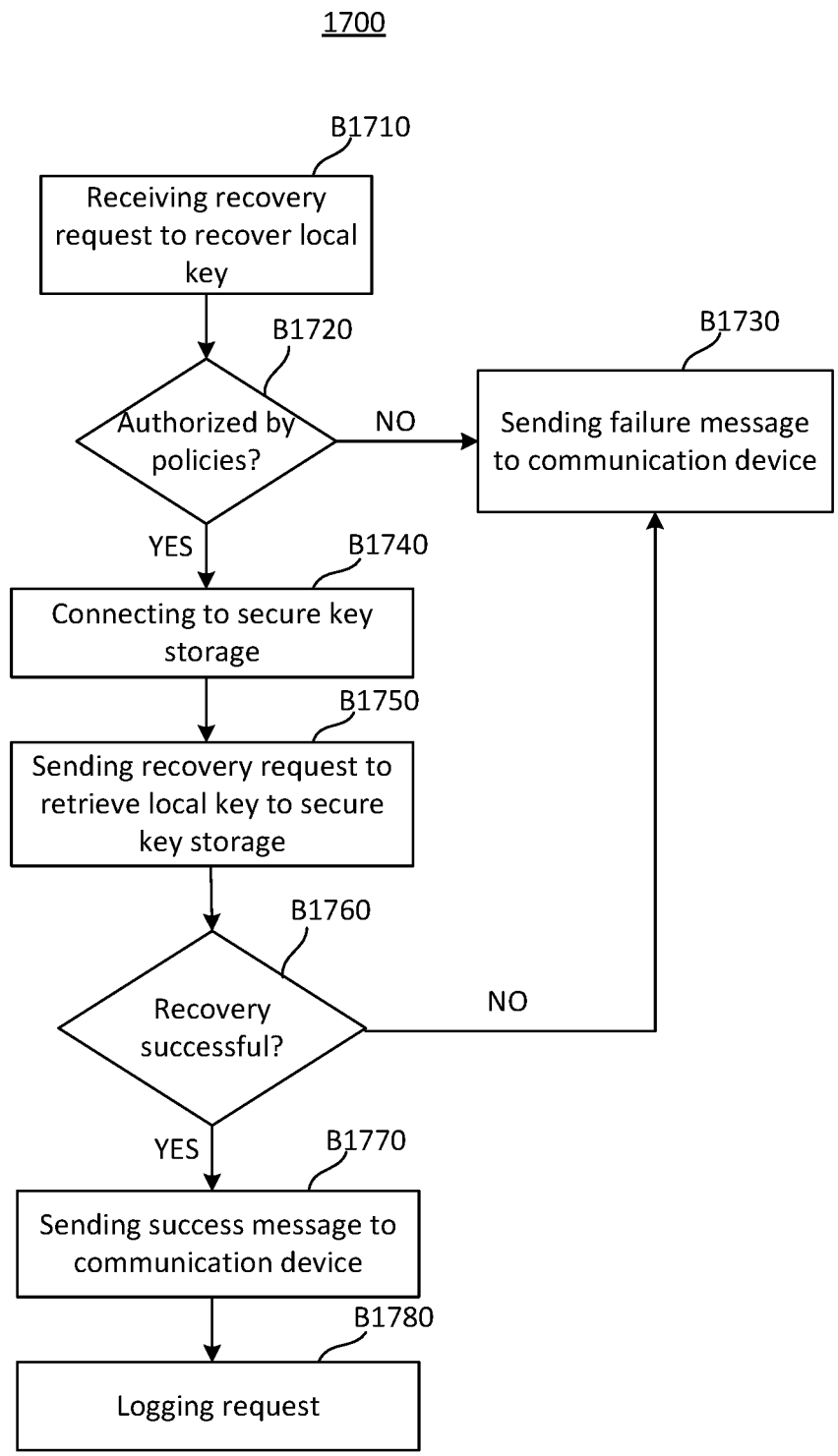
FIG. 17 is a process flow diagram illustrating an example of a local key recovery method according to various embodiments.

FIG. 17 is a process flow diagram illustrating an example of a local key recovery method 1700 according to various embodiments. Referring to FIGS. 1-17, the local key recovery method 1600 may be performed by the processor 1270 of the applied key management system 1010 according to some embodiments. At block B1710, the processor 1270 (e.g., the applied key management server interface 1210) may receive the recovery request to recover a previously registered and/or stored local key from the communication device 1000 (e.g., from the applied key management client interface 1120) in some embodiments. The request may include one or more of the local key (e.g., the key attributes 160 of the local key), application identifier identifying an application (e.g., the local application 1105) associated with the local key, user identifier (e.g., a user account or credential) identifying a user authorized to use the local key, a device identifier identifying the communication device 1000, time at which the local key may be collected by the application plugin 1110 or the applied key management client interface 1120, or any other identifier identifying the previously registered and/or stored local key.

At block B1720, the processor 1270 may determine whether the recovery request is authorized by the policies 115 (e.g., second policies). The request agent 1220 may receive the recovery request from the applied key management server interface 1210 and generate an action request based on the recovery request. The action request may include one or more of the local key (e.g., the key attributes 160 of the local key), application identifier identifying an application (e.g., the local application 1105) associated with the local key, user identifier (e.g., a user account or credential) identifying a user authorized to use the local key, a device identifier identifying the communication device 1000, time at which the local key may be collected by the application plugin 1110 or the applied key management client interface 1120, or any other identifier identifying the previously registered and/or stored local key. The action module 1230 may present the action request to the policy engine 1240 for inspection by the second policies.

In some embodiments, the policy engine 1240 may determine whether the particular communication device 1000 may be authorized to make a recovery request based on the second policies. The second policies may be some of the policies 115 used to evaluate whether request recovery or retrieval of a previously registered and/or stored local key is authorized. The policy engine 1240 may then determine whether the node (or parent node(s)) and/or group associated with the communication device 1000 may be associated with authorization to make a recovery request for a local key. Illustrating with a non-limiting example, at least one of the second policies may indicate that if the communication device 1000 is associated with node B or Group 2, then the action request for recovering a local key corresponding to the communication device 1000 may be denied. Illustrating with another non-limiting example, at least one of the second policies may indicate that if the node (e.g., node B) associated with the communication device 1000 has a particular parent node (e.g., node A), then the action request for recovering a local key corresponding to the communication device 1000 may be denied.

Illustrating with another non-limiting example, the policy engine 1240 may determine whether an action request (for recovering a local key) for the particular application (identified by the application identifier identifying the local application 1105) may be authorized. At least one of the second policies may indicate that an action request (for recovering a local key) for an application may not be authorized in some embodiments. For instance, one of the second policies may indicate that if the application associated with an action request is an email application, then the action request (for recovering a local key) corresponding to the email application may be denied.

Illustrating with yet another non-limiting example, the policy engine 1240 may determine whether an action request for the particular user account (identified by the user identifier identifying the user of the local application 1105) may be authorized to make a request for recovering a local key. At least one of the second policies may indicate that an action request (for recovering a local key) for a given user may not be authorized in some embodiments. For instance, one of the second policies may indicate that if the user associated with an action request (for recovering a local key) is "User_1," then the action request corresponding to the user may be denied.

Illustrating with yet another non-limiting example, the policy engine 1240 may determine whether an action request (for recovering a local key) may be authorized based on one or more other suitable key attributes 160 such as, but not limited to, key size of the local key, classification of the local key, time at which the local key has been requested, preferred secure key storage, role associated with the communication device 1000, name of the local key, or the like.

In some embodiments, the key attributes 160 including, but not limited to, the key size of the local key, classification of the local key, time at which the local key has been requested, preferred secure key storage, role associated with the communication device 1000, name of the local key, and/or the like may be included as a part of the recovery request received by the applied key management system 1010 (e.g., a block B1710). In some embodiments, such key attributes 160 may be determined by the processor 1270 (e.g., the request agent 1220, the action module 1230, agent 1250, or policy engine 1240) based on one or more of the application identifier, user identifier, device identifier, or the like. For example, the processor 1270 (e.g., the request agent 1220, the action module 1230, agent 1250, or policy engine 1240) may determine the key attributes 160 for the local key by checking a look-up table stored in the memory 1280.

In response to determining that the action request may not be authorized by the second policies (B1720: NO), the processor 1270 may be configured to send a failure message to the communication device 1000, at block B 1530. For example, the policy engine 1240 may send a failure message to the action module 1230 in response to determining failure based on the policies 115. The action module 1230 may forward the failure message to the request agent 1220. The request agent 1220 may forward the failure message to the applied key management server interface 1210. The applied key management server interface 1210 may send the failure message to the communication device 1000.

The communication device 1000, in response to receiving the failure message, may notify the user (e.g., the operator of the communication device 1000) of the local application 1105 of the failure. For instance, the processor 1140 (e.g., the application plugin 1110) may configure the output device of the user interface 1160 to display a visual message, output an audio message, or otherwise generate any suitable audiovisual or tactile feedback to the user notifying the user of the failure to recover the local key.

On the other hand, in response to determining that the action request may be authorized by the second policies (B1720: YES), the processor 1270 may be configured to connect to the secure key storage 1020, at block B1740. For example, the processor 1270 (e.g., the secure key storage interface 1260) may interface with the secure key storage 1020 via suitable standards to initiate communication with the secure key storage 1020. At block B1750, the processor 1270 (e.g., the secure key storage interface 1260) may send a recovery request to recover the local key corresponding to the action request from the secure key storage 1020. The secure key storage interface 1260 may act on behalf of the communication device 1000 to recover the previously registered and/or stored local key from the secure key storage 1020.

At block B1760, the processor 1270 (e.g., the secure key storage interface 1260) may determine whether the local key is successfully recovered from the secure key storage 1020. The secure key storage interface 1260 may receive the previously registered and/or stored local key message if the recovery attempt is successful. The secure key storage interface 1260 may receive a failure message from the secure key storage 1020 if the recovery attempt is unsuccessful.

In response to determining that the recovery attempt is unsuccessful (B1760: NO), the processor 1270 may send a failure message to the communication device 1000, at block B1730. For example, the secure key storage interface 1260 may send a failure message to the action module 1230 in response to receiving the failure message. The action module 1230 may forward the failure message to the request agent 1220. The request agent 1220 may forward the failure message to the applied key management server interface 1210. The applied key management server interface 1210 may send the failure message to the communication device 1000.

The communication device 1000, in response to receiving the failure message, may notify the user (e.g., the operator of the communication device 1000) of the failure. For instance, the processor 1140 (e.g., the application plugin 1110) may configure the output device of the user interface 1160 to display a visual message, output an audio message, or otherwise generate any suitable audiovisual or tactile feedback to the user notifying the user of the failure to recovery the previously registered and/or stored local key.

On the other hand, in response to determining that the recovery attempt is successful (B1760: YES), the processor 1270 may send the recovered local key to the communication device 1000, at block B1770. For example, the secure key storage interface 1260 may send the recovered local key to the action module 1230 in response to receiving the recovered local key. The action module 1230 may forward the recovered local key to the request agent 1220. The request agent 1220 may forward the recovered local key to the applied key management server interface 1210. The applied key management server interface 1210 may send the recovered local key to the communication device 1000.

At block B1780, the processor 1270 may log the recovery request and store the action in the memory 1280. The action module 1230 may store information related to the action, including the application identifier, user identifier, device identifier, time at which recovery of the local key may be request, time at which the recovery request is sent to the secure key storage 1020, identifier (e.g., a UUID of the operation or action corresponding to the recovery, relevant second policies used for evaluating the recovery, and/or the like.

In other embodiments in which the secure key storage 1020 may be local to the applied key management system 1010, instead of sending the recovery request to the secure key storage 1020 via a network (e.g., via the second network link), the processor 1270 may send the request locally to the secure key storage 1020, for example, at blocks B1740 and B1750. Additionally, the processor 1270 may receive the recovered local key from the secure key storage 1020 locally in such embodiments.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a DSP, an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes Compact Disc (CD), laser disc, optical disc, Digital Versatile Disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to some embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for registering and storing a local key associated with a local application of a communication device, comprising:
   retrieving the local key from a local key store of the communication device to send a request to an applied key management system, the applied key management system implementing a centralized management approach;
   sending the request to the applied key management system to register and store the local key at a secure key storage, the request including the local key; and
   receiving a response from the applied key management system indicating that the local key is successfully registered and stored in response to acceptance of the local key based on at least one key attribute associated with the local key conforming to one or more policies and the registering and storing of the local key at the secure key storage are authorized by at least one first policy of the one or more policies, wherein the at least one key attribute indicates that security and cryptographic considerations of the local key are acceptable based on the one or more policies.

2. The method of claim 1, wherein the local key is one or more of a locally-generated encryption key or locally-stored encryption key.

3. The method of claim 1, wherein the local key comprises one or more of a key file for secure data storage, key data for Secure Shell (SSH), or license key for an application.

4. The method of claim 1, wherein the secure key storage is one or more of a Hardware Security Module (HSM), key management server, or secure data storage.

5. The method of claim 1, wherein:
   the request is sent over a network link; and
   the response is received over the network link.

6. The method of claim 1, further comprising determining, by the communication device, whether the local key needs to be registered and stored.

7. The method of claim 6, wherein determining whether the local key needs to be registered and stored comprises determining whether the local key has been previously registered and stored.

8. The method of claim 1, further comprising:
   sending a recovery request to the applied key management system to recover the local key from the secure key storage, wherein the recovery request recovers the registered and stored local key; and
   receiving the local key from the applied key management system, wherein recovering the local key from the secure key storage is authorized by at least one second policy.

9. A communication device, comprising:
   a local key store;
   a memory; and
   a processor implementing a client interface; wherein:
   the client interface is configured to:
       retrieve the local key from the local key store to send a request to an applied key management system, the applied key management system implementing a centralized management approach;

send the request to the applied key management system to register and store the local key at a secure key storage, the request including the local key; and receive a response from the applied key management system indicating that the local key is successfully registered and stored in response to acceptance of the local key based on at least one key attribute associated with the local key conforming to one or more policies and the registering and storing of the local key at the secure key storage are authorized by at least one first policy of the one or more policies, wherein the at least one key attribute indicates that security and cryptographic considerations of the local key are acceptable based on the one or more policies.

10. A non-transitory processor-readable medium having processor-readable instructions, when executed, causes a processor to:

retrieve a local key from a local key store of a communication device to send a request to an applied key management system, the applied key management system implementing a centralized management approach;

send the request to the applied key management system to register and store the local key at a secure key storage, the request including the local key; and receive a response from the applied key management system indicating that the local key is successfully registered and stored in response to acceptance of the local key based on at least one key attribute associated with the local key conforming to one or more policies and the registering and storing of the local key at the secure key storage are authorized by at least one first policy of the one or more policies, wherein the at least one key attribute indicates that security and cryptographic considerations of the local key are acceptable based on the one or more policies.

11. A method for registering and storing a local key associated with a local application of a communication device, comprising:

receiving a request from the communication device to register and store the local key, the request including the local key retrieved from a local key store of the communication device;

determining acceptability of the local key based on at least one key attribute associated with the local key conforming to one or more policies, the at least one key attribute indicating security and cryptographic considerations;

evaluating the request based on at least one first policy of the one or more policies to determine authorization of the request; and sending the request to register and store the local key to a secure key storage in response to determining that the local key is acceptable and that the request is authorized.

12. The method of claim 11, wherein:
the request is received from the communication device via a first network link; and
the request is sent to the secure key storage via a second network link.

13. The method of claim 11, wherein:
the request is received from the communication device via a first network link; and
the request is sent to the secure key storage locally.

14. The method of claim 11, wherein the request comprises one or more of key attributes of the local key, application identifier identifying the local application, user identifier identifying a user authorized to use the local key, device identifier identifying the communication device, or time at which the local key is collected.

15. The method of claim 14, wherein evaluating the request based on the at least one policy comprises evaluating one or more of the key attributes of the local key, application identifier identifying the local application, user identifier identifying a user authorized to use the local key, device identifier identifying the communication device, or time at which the local key may be collected based on the at least one first policy.

16. The method of claim 11, further comprising:

receiving a recovery request from the communication device, wherein the recovery request corresponds to recovering the local key from the secure key storage, the recovery request recovering the registered and stored local key;

evaluating the recovery request based on at least one second policy;

sending the recovery request to the secure key storage;

receiving the local key from the secure key storage; and sending the local key to the communication device.

17. The method of claim 16, wherein the recovery request received from the communication device comprises one or more of key attribute of the local key, application identifier identifying the local application associated with the local key, user identifier identifying a user authorized to use the local key, device identifier identifying the communication device, or time at which the local key is collected.

18. The method of claim 17, wherein evaluating the recovery request based on the at least one policy comprises evaluating one or more of the key attribute of the local key, application identifier identifying the local application associated with the local key, user identifier identifying a user authorized to use the local key, device identifier identifying the communication device, or time at which the local key is collected based on the at least one second policy.

19. An applied key management system, comprising:
a memory; and
a processor, the processor configured to:
receive a request from a communication device to register and store a local key, the request including the local key retrieved from a local key store of the communication device;

determine acceptability of the local key based on at least one key attribute associated with the local key conforming to one or more policies, the at least one key attribute indicating security and cryptographic considerations;

evaluate the request based on at least one first policy of the one or more policies to determine authorization of the request; and send the request to register and store the local key to a secure key storage in response to determining that the local key is acceptable and that the request is authorized.

20. A non-transitory processor-readable medium having processor-readable instructions, when executed, causes a processor to:

receive a request from a communication device to register and store a local key, the request including the local key retrieved from a local key store of the communication device;

determine acceptability of the local key based on at least one key attribute associated with the local key conforming to one or more policies, the at least one key attribute indicating security and cryptographic considerations;

evaluate the request based on at least one first policy of the one or more policies to determine authorization of the request; and send the request to register and store the local key to a secure key storage in response to determining that the local key is acceptable and that the request is authorized.

21. The method of claim 1, wherein the response indicates that registering and storing the local key at the secure key storage are authorized by the at least one first policy.

22. The method of claim 11, wherein evaluating the request based on the at least one first policy comprises determining that the local key is authorized to be registered and stored at the secure key storage based on the at least one first policy.

23. The method of claim 14, wherein evaluating the request based on the at least one first policy comprises:

generating an action request based on the request received from the communication device, wherein the action request comprises the one or more of key attributes of the local key, the application identifier identifying the local application, the user identifier identifying the user authorized to use the local key, the device identifier identifying the communication device, or the time at which the local key is collected; and presenting the action request to a policy engine for inspection by the at least one first policy.

24. The method of claim 11, wherein evaluating the request based on the at least one first policy comprises determining whether the communication device is associated with a node within a hierarchical structure or a classification.

25. The method of claim 1, wherein the local key is an encryption key used by the local application of the communication device to unlock one or more application functionalities.

* * * * *